(12) United States Patent
Kinnunen et al.

(10) Patent No.: US 11,770,458 B1
(45) Date of Patent: Sep. 26, 2023

(54) SYSTEMS FOR EXCHANGING DATA USING INTERMEDIATE DEVICES

(71) Applicant: HEADSPIN, INC., Sunnyvale, CA (US)

(72) Inventors: Simo Antti Kalervo Kinnunen, Shibuya-ku (JP); James Riley Wilburn, Arlington, VA (US); Brien Colwell, Redwood City, CA (US)

(73) Assignee: HEADSPIN, INC., Sunnyvale, CA (US)

( * ) Notice: Subject to any disclaimer, the term of this patent is extended or adjusted under 35 U.S.C. 154(b) by 0 days.

(21) Appl. No.: 18/065,453

(22) Filed: Dec. 13, 2022

Related U.S. Application Data

(63) Continuation of application No. 17/447,722, filed on Sep. 15, 2021, now Pat. No. 11,570,274, which is a continuation-in-part of application No. 17/179,136, filed on Feb. 18, 2021, now Pat. No. 11,416,383.

(51) Int. Cl.
*G06F 9/44* (2018.01)
*H04L 67/60* (2022.01)
*G06F 11/36* (2006.01)

(52) U.S. Cl.
CPC .......... *H04L 67/60* (2022.05); *G06F 11/3664* (2013.01); *G06F 11/3668* (2013.01)

(58) Field of Classification Search
None
See application file for complete search history.

(56) References Cited

U.S. PATENT DOCUMENTS

| 9,107,081 | B1 * | 8/2015 | Pezeshkian | H04W 16/26 |
| 9,977,407 | B2 * | 5/2018 | Prosak | G05B 19/056 |
| 10,557,889 | B2 * | 2/2020 | Montoya | G06F 11/2294 |
| 2016/0241604 | A1 * | 8/2016 | Klein | H04L 65/403 |
| 2019/0363806 | A1 * | 11/2019 | Glover | H04B 17/15 |

* cited by examiner

*Primary Examiner* — Qamrun Nahar
(74) *Attorney, Agent, or Firm* — Lindauer Law, PLLC

(57) ABSTRACT

When significant latency exists between a test device executing an application and a remote device used to debug the application, an intermediate device is used to receive requests from the remote device. When a first request is received, the intermediate device determines other requests that are related to the first request, sequentially sends the other requests to the test device, and receives a response after each request, using a wired connection or a wireless network having lower latency than wireless communication between the remote device and the test device. The intermediate device then sends each of the responses to the remote device. The remote device stores the responses. The remote device is then able to use the stored data to determine responses for subsequent requests.

20 Claims, 10 Drawing Sheets

TIME = T2

SYSTEMS FOR EXCHANGING DATA USING INTERMEDIATE DEVICES

PRIORITY

This application is a continuation of and claims priority to the pending United States Patent Application having application Ser. No. 17/447,722, filed Sep. 15, 2021. U.S. patent application Ser. No. 17/447,722 is incorporated by reference herein in its entirety.

U.S. patent application Ser. No. 17/447,722 claims priority to U.S. patent application Ser. No. 17/179,136 filed Feb. 18, 2021, now issued as U.S. Pat. No. 11,416,383. U.S. patent application Ser. No. 17/179,136 is incorporated by reference herein in its entirety.

BACKGROUND

An application may function differently at different locations, on different devices, and under different network conditions. Acquiring information about the performance of a device at a remote location or using a remote network may be useful to improve performance of the application under different conditions than those locally available to an application developer. However, the exchange of data with a device associated with a remote location or network may be affected by significant latency, which may cause the acquisition of useful information to be difficult or impossible. For example, a debugging protocol used to communicate with a device at a remote location may require exchanges of individual requests and responses, each of which may be affected by significant latency.

INCORPORATION BY REFERENCE

U.S. patent application Ser. No. 14/850,798, filed Sep. 10, 2015 and titled "System for Application Test", now U.S. Pat. No. 9,681,318, is hereby incorporated by reference in its entirety.

U.S. application Ser. No. 15/425,757, filed Feb. 6, 2017 and titled "Mobile Device Point of Presence Infrastructure", now U.S. Pat. No. 10,729,038, is hereby incorporated by reference in its entirety.

U.S. application Ser. No. 15/425,652, filed Feb. 6, 2017 and titled "System for Management of an Array of Proxy Access Devices", now U.S. Pat. No. 10,855,789 is hereby incorporated by reference in its entirety.

U.S. patent application Ser. No. 15/783,859, filed Oct. 13, 2017 and titled "System for Testing Using Remote Connectivity" is hereby incorporated by reference in its entirety.

U.S. patent application Ser. No. 16/694,886, filed Nov. 25, 2019 and titled "System for Identifying Issues During Testing of Applications", now U.S. Pat. No. 11,374,744 is hereby incorporated by reference in its entirety.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1A:
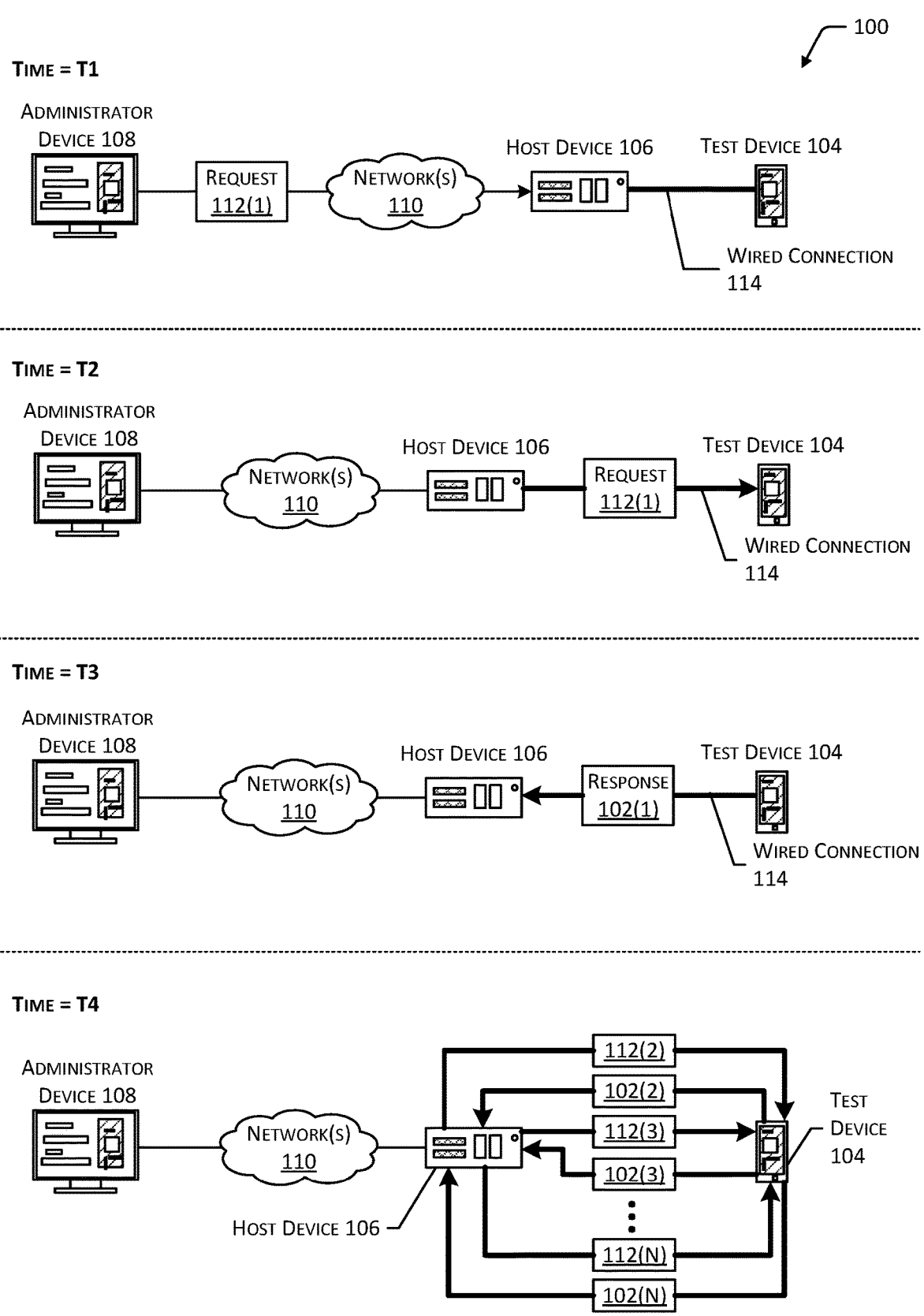
FIGS. 1A and 1B are a series of diagrams depicting an implementation of a process for determining responses from a test device using a host device that may provide the responses to an administrator device in a manner that incurs less latency than direct communication between the administrator device and the test device.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

A computing device may provide various functions, some of which may be associated with one or more applications. Computing devices may include, for example, smartphones, laptops, tablet computers, desktop computers, servers, embedded devices, wearable computing devices, appliances, computing devices associated with vehicles, set top box devices, smart televisions, network-enabled speakers, and so forth. Functions provided by such computing devices may include, without limitation, retrieval or transmission of data, presentation of data using a display device, acquisition of image or video data using a camera, output of audio, acquisition of audio data using a microphone, processing of data, and so forth. For example, a smartphone executing an application may present a video using a display, may output audio associated with the video using a speaker, and may receive input to control presented output using a touch sensor.

The performance of an application executed by a computing device ("device") may be evaluated based on various characteristics, such as video quality, an amount of content that is presented, a frame rate, an amount of data that is transferred, memory use, processor use, and so forth. In some cases, these characteristics may be affected by the location of the device executing the application, characteristics of the device itself, characteristics of one or more networks used to exchange data, and so forth. For example, execution of an application by a device using a first network associated with a first geolocation may exhibit certain performance metrics, while execution of the application by a similar device using a second network associated with a second geolocation may exhibit different performance metrics. Executing the application under certain conditions, such as by using a device that communicates using selected networks or is located at a selected location, may be used to determine characteristics that indicate acceptable or unacceptable performance of the application under those conditions. For example, a computing device at a selected location or that accesses a selected network may be caused to execute an application to be tested, and information generated while performing a logging or debugging process during execution of the application may be provided to other computing devices to enable performance of the application to be evaluated. However, configuring multiple types of devices at multiple locations around the world to execute an application, determining data regarding execution of the application, and providing this data to other devices may be a very time and resource-intensive task. For example, the limited availability of devices, locations, network conditions, and so forth that may be tested may hinder the ability to test and improve applications under a wide variety of conditions.

Additionally, in some cases, the exchange of data between devices at different locations or that use different networks may be associated with significant latency, which may prevent the acquisition of useful information. For example, a first device at a first geolocation using a first network may exchange data with a second device executing an application at a second geolocation using a second network. In such a case, each individual communication sent from the first device to the second device, and each individual communication sent from the second device to the first device, may be affected by the latency associated with communication between the different geolocations and networks. Continuing the example, one or both devices may communicate using a particular debugging protocol, such as the Link Layer Discovery Protocol (LLDB), which requires each request provided by the first device to be answered by a response from the second device before a subsequent request is provided, and vice versa. In such a case, if a large number of requests and responses are exchanged to control a test associated with an application, exchange debugging commands, transfer data, and so forth, each individual request and response may be affected by the latency associated with communication between the different geolocations and networks. For example, if each communication between a first device and a second device is affected by an average latency of 100 milliseconds (ms), acquisition of useful information may become difficult or impossible. Continuing the example, the first device may provide a request associated with determining shared libraries used by the second device, which may be affected by approximately 100 ms of latency. The second device may provide a response that includes a list of twenty shared libraries that are used, the response also being affected by approximately 100 ms of latency. The first device may then send a request associated with the first library, which may be affected by latency. Based on the LLDB protocol or another similar protocol that is used, the first device may then wait for a response from the second device before providing a subsequent request. The response from the second device associated with the first library may be affected by latency, a second request from the first device associated with the next library in the list may be affected by similar latency, a second response from the second device may be similarly affected, and so forth. In such a case, the sequential exchange of a significant number of requests and responses, each of which may be affected by significant latency, may cause communication using the LLDB protocol, or another similar protocol, to be prohibitive. For example, after exchanging information regarding a list of twenty shared libraries, multiple seconds may have elapsed, and network conditions or performance metrics associated with the time when the first request was sent may have changed.

Described in this disclosure are systems and methods for exchanging data between devices using a separate, intermediary device that may communicate locally with a device executing an application to be tested, then send determined data to a remote device using a smaller number of transmissions when compared to the individual exchange of requests and responses by the remote device and the device executing the application. A first computing device may execute an application to be tested. A second computing device may communicate with the first computing device using a wired connection, or in some cases, may communicate with the first computing device using a wireless communication interface that communicates using one or more wireless networks that are not affected by significant latency. For example, the second computing device may be located physically proximate to the first computing device, such as in the same geolocation. A third computing device may communicate with the second computing device using a wireless communication interface that accesses one or more wireless networks and may be used to debug or otherwise control a test associated with the application. For example, the third computing device may be located at a different geolocation than the first and second computing devices and may be used to test execution of the application at various geolocations, using different networks, under different conditions, and so forth.

In cases where direct communications between the first computing device and third computing device are affected by significant latency, use of the third computing device to acquire information associated with performance of the application by the first computing device may be difficult or impossible. For example, communication using the LLDB protocol, or another similar protocol, may require the alternating exchange of requests and responses between the first and third computing devices. In such a case, when each individual request and response is affected by significant latency, and a large number of communications are exchanged, the acquisition of useful data may be significantly hindered, or rendered impossible. For example, if the first and third computing devices exchange a large number of communications, and a final response is received a significant length of time after an initial request was sent, the information included in the final response may be associated with different conditions, performance metrics, or other parameters that have changed since the time that the initial request was sent.

To reduce the effect of the latency associated with communications between the first computing device and third computing device, the second computing device may be used to acquire information from the first computing device, then send the acquired information to the third computing device using a smaller number of communications than the number that would be used by the first and third computing devices to exchange data using a protocol-dependent channel. For example, the third computing device may provide a first request to the second computing device using a wireless network. The first request may be associated with acquisition of information regarding execution of an application by the first computing device. The second computing device may provide this request to the first computing device, which may provide a first response to the second computing device. Based on the first request, or the first response received from the first computing device, the second computing device may determine one or more additional requests that are related to the first request or first response. For example, historically, the third computing device may have previously provided one or more additional requests after providing the first request, indicating that the additional requests are related to the first request. Continuing the example, the first request may request a list of libraries or other shared resources used by the first computing device while executing the application. The first response from the first computing device may include a list of shared libraries. Historically, subsequent to receiving a list of libraries, the third computing device may have previously provided additional requests associated with each of the libraries included in the list. As another example, the first request may request information regarding one or more regions of application memory associated with the first computing device, threads or other computational resources used by the first computing device, and so forth. The first response may include a list of addresses for memory regions, register values for threads, and so forth. Historically, subsequent to receiving such information, the third computing device may have previously provided additional requests for data stored in regions of application memory.

After receiving the first request or the first response, the second computing device may determine one or more second requests that are associated with the first request or the first response. The second computing device may then send the second request(s), sequentially, to the first computing device, and receive a response from the first computing device after each request (e.g., using the LLDB protocol, or another similar protocol). Because the second computing device is in wired communication with the first computing device, or in communication with the first computing device using a wireless network having less latency than communications between the first and third computing devices, the exchange of requests and responses between the first and second computing devices may occur much more quickly, and with less latency, than communications between the first and third computing devices. The second computing device may therefore send a potentially large number of additional requests, and determine associated responses from the first device, using significantly less time than the time that would have been used during a similar exchange of data between the first and third computing devices. In some implementations, the second computing device may send multiple requests to the first computing device in parallel. For example, certain types of requests, such as file transfers, may occur independent of the LLDB protocol or another similar protocol, and requests of a certain type may be sent to the first computing device independent of other requests that are sent or responses that are received. The second computing device may then send to the third computing device each of the determined second responses, and in some implementations data indicative of the additional request(s) that were sent to the first computing device, before sending the first response to the first request.

The third computing device may store this received data in a cache or other data storage medium. Subsequently, when the third computing device prepares to send an additional request, correspondence between this request and the stored data received from the second computing device may be determined. If the request corresponds to the stored data, then data stored in the cache may be used to determine a response without sending the request and incurring additional latency. The third computing device may therefore determine responses based on data stored in the cache, without transmitting requests to and receiving responses from devices in a remote geolocation, and incurring the associated latency.

As a result, through use of the techniques described herein, the third computing device may determine information associated with execution of an application by the first computing device without incurring the latency associated with each transmission of a request or response. Additionally, use of such techniques may improve the accuracy of the data received by the third computing device. For example, when the second computing device provides additional requests to the first computing device promptly after receipt of the first request or the first response, without being affected by the latency associated with communication with the third computing device, the responses received from the first computing device may indicate values and other information more closely related in time to the time at which the first request was received.

In cases where a subsequent request generated by the third computing device does not correspond to data received from the second computing device, the request may be sent to the second computing device, which may send the request to the first computing device, which may in turn send a response. In some implementations, data associated with the second computing device may be updated so that subsequently, the subsequent request generated by the third computing device may be provided to the first computing device in response to receiving the first request or first response. In some implementations, in cases where data provided to the third computing device is not used, such as if a request determined by the second computing device and the corresponding response are not accessed by the third computing device, the data associated with the second computing device may be updated so that subsequently, the subsequent request that was not accessed may not be provided to the first computing device in response to receiving the first request or first response.

In some implementations, in response to determining a subsequent request that may change the state of the application or memory associated with the first computing device, the third computing device may remove the stored data from the cache and instead provide the subsequent request to the second device. For example, use of stored data to determine a response to a subsequent request that includes a write command or that causes performance of a function that may change the data stored in application memory, the threads used by the first computing device, and so forth, may result in determining an inaccurate response using data that would not reflect the state of the application on the first computing device. The second device may receive the subsequent request and repeat the process described above, such as by providing the subsequent request to the first computing device, receiving a response, determining one or more associated requests, providing the associated requests to the first computing device to sequentially determine responses, and providing the determined data to the third computing device.

Implementations described in this disclosure may therefore enable the third computing device to be used to control a test associated with an application executing on the first device, such as by using the LLDB protocol or a similar protocol associated with receipt of a response after each request, by using the second computing device to predict requests that are associated with or related to the initial request or initial response, then provide these requests to the first computing device sequentially using a low-latency method of communication. The second computing device may then provide the responses determined based on these requests to the third computing device as a single communication or set of communications that will be less affected by latency than direct communication between the first and third computing devices. The third computing device may use subsequent requests, associated with the LLDB protocol or another similar protocol, to interrogate the stored data to determine associated responses using a low-latency method of communication. The determined responses may include accurate performance metrics or other data due to generation of the responses by the first computing device promptly after receipt of the initial request, in response to the second computing device providing the related or associated requests to the first computing device promptly after receipt of the initial response, using a low-latency method of communication.

Figure 1B:
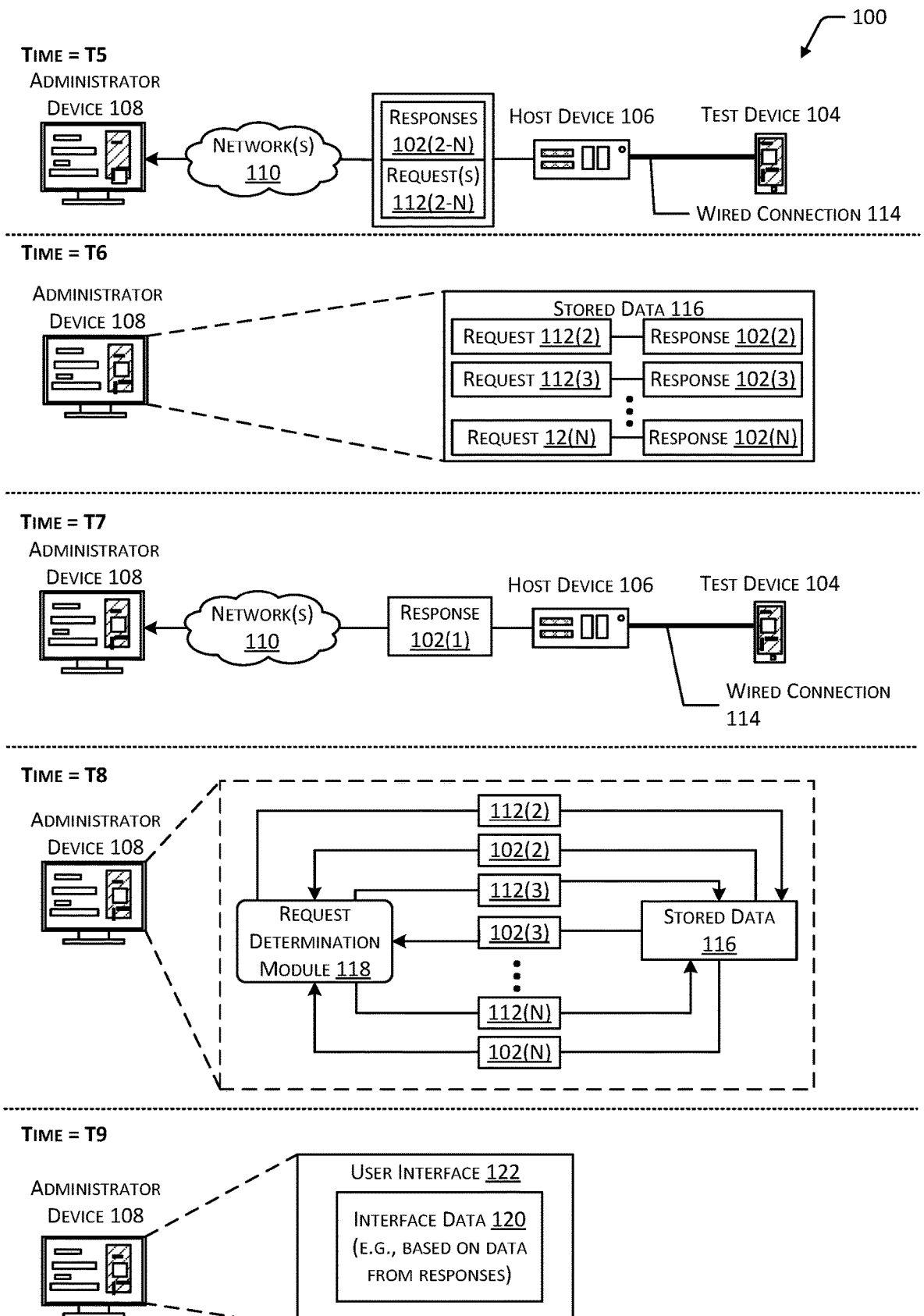

FIGS. 1A and 1B are a series of diagrams 100 depicting an implementation of a process for determining responses 102 from a test device 104 using a host device 106 that may provide the responses 102 to an administrator device 108 in a manner that incurs less latency than direct communication between the administrator device 108 and the test device 104. A test device 104 may store, execute, and use an application under test (AUT). The AUT may include an application that is at any stage in a development or maintenance lifecycle. For example, the AUT may include software that has not yet been released (e.g., an alpha, prerelease, or pre-launch version), or may include a previously released version that is undergoing testing. Performance of the AUT and of the test device 104 may be affected by various factors including, without limitation, characteristics or components of the test device 104, the location of the test device 104, characteristics of the location, networks 110 used by the test device 104, characteristics of the networks 110, protocols used by the test device 104, and so forth. The test device 104 may include any type of computing device including, without limitation, a smartphone, a portable computing device, an automotive computing device, a wearable computing device, a personal computer, one or more servers, and so forth.

The administrator device 108 may include any type of computing device, including, without limitation, the types of computing devices described with regard to the test device 104. The administrator device 108 may be used to control a test associated with the AUT executing on the test device 104. For example, the administrator device 108 may include an integrated development environment (IDE) to facilitate the creation and editing of program code, debugging, compiling, and so forth, associated with the AUT. Continuing the example, the administrator device 108 may be usable to cause the test device 104 to perform one or more functions associated with the AUT, and the test device 104, administrator device 108, or host device 106 may determine data indicative of the performance metrics or other characteristics of the test device 104 or AUT. Performance metrics may include, for example, video quality, an amount of content that is presented, a frame rate, an amount of data that is transferred, memory use, processor use, and so forth. Data determined by the test device 104 during use of the AUT may also include regions of memory that are used, threads that are used, and so forth.

In some cases, a test device 104 may be located a significant distance from the administrator device 108, or may access one or more networks 110 that affect communications between the test device 104 and administrator device 108 with significant latency. For example, the administrator device 108 and test device 104 may be located in different geolocations, and may access different wide area networks (WANs), cellular networks, and so forth, which may in turn send communications using the Internet. In such a case, each request 112 sent by the administrator device 108 may be affected by the latency associated with the network(s) 110, and each response 102 sent by the test device 104 would be similarly affected by the latency.

In some implementations, the test device 104 and administrator device 108 may be configured to communicate using the LLDB protocol, or another similar protocol, in which after a first request 112(1) is sent, a first response 102(1) must be received before a second request 112(2) is sent. In such a case, the exchange of individual requests 112 and individual responses 102 in an alternating manner, each of which would be affected by the significant latency associated with the network(s) 110, may cause the acquisition of data from the test device 104 by the administrator device 108 to be impractical. For example, responses 102 received from the test device 104 a significant length of time after the first request 112(1) was sent may no longer include relevant information regarding performance metrics of the test device 104 or AUT.

The host device 106 may be used to determine responses 102 from the test device 104 more efficiently after receipt of the first request 112(1) from the administrator device 108. The host device 106 may include any type of computing device including, without limitations, the types of computing devices described with regard to the test device 104. In some implementations, the host device 106 may communicate with the test device 104 using a wired connection 114. For example, a wired Ethernet connection, or other type of wired connection 114, may enable data, such as requests 112 and responses 102, to be exchanged between the test device 104 and host device 106 with minimal latency. In other implementations, the host device 106 and test device 104 may communicate using one or more wireless networks, such as a local area network (LAN). The host device 106 may be located proximate to the test device 104, such as within the same geolocation, or may communicate with the test device 104 using one or more networks 110 that are affected by a smaller amount of latency than the networks 110 through which data may be exchanged with the administrator device 108. Therefore, the host device 106 may provide requests 112 to the test device 104 and acquire responses 102 from the test device 104, in an alternating manner associated with the LLDB protocol, more rapidly and with less latency than if the administrator device 108 were used to provide requests 112 and receive responses 102.

As shown in FIG. 1A, at a first time T1, the administrator device 108 may provide a first request 112(1) to the host device 106 via one or more networks 110. The first request 112(1) may be associated with one or more functions of the test device 104 or AUT. For example, the first request 112(1) may be associated with one or more shared resources, such as libraries, used by the test device 104 or AUT. As another example, the first request 112(1) may be used to cause the test device 104 to perform one or more functions or to log or otherwise acquire data associated with use of one or more components of the test device 104, performance of the AUT, and so forth. As yet another example, the first request 112(1) may be associated with regions of memory or processing threads used by the test device 104. In some implementations, transmission of the first request 112(1) by the administrator device 108 may be associated with the LLDB protocol, or another similar protocol. For example, the administrator device 108 may be configured to withhold transmission of a subsequent request 112 until a response 102 to the first request 112(1) is received.

At a second time T2, the host device 106 may provide the first request 112(1) to the test device 104 using the wired connection 114. While transmission of the first request 112(1) from the administrator device 108 to the host device 106 may be affected by the latency associated with the network(s) 110, transmission of the first request 112(1) from the host device 106 to the test device 104 using the wired connection 114 may be affected by a smaller amount of latency. In some implementations, receipt of the first request 112(1) by the test device 104 may be associated with the LLDB protocol, or another similar protocol, in which the test device 104 is configured to provide a response 102 to the first request 112(1) before receiving and responding to a subsequent request 112. In some cases, the host device 106 may communicate with the administrator device 108 and the test device 104 using a different protocol. For example, the host device 106 may exchange data with the administrator device 108 or test device 104 independent of the LLDB protocol, such as by providing communications to the administrator device 108 or test device 104 without necessarily waiting to receive requests 112 or responses 102. In other cases, the host device 106 may provide data to the administrator device 108 using the same communication channel associated with the LLDB protocol, but packets provided by the host device 106 may include characteristics that enable the packets to be recognized and processed independently from the response 102(1) to the first request 112(1), such as by storing the received data in a cache.

At a third time T3, the test device 104 may determine a first response 102(1) based on the first request 112(1) and may send the first response 102(1) to the host device 106 using the wired connection 114. In some implementations, transmission of the first response 102(1) by the test device 104 may be associated with the LLDB protocol, or another similar protocol. For example, the test device 104 may be configured to receive a subsequent request 112 after sending the first response 102(1). As described previously, transmission of the first response 102(1) using the wired connection 114 may be affected by a generally small amount of latency that is less than latency associated with communication using the network(s) 110.

At a fourth time T4, the host device 106 may determine one or more additional requests 112 based on one or more of the first request 112(1) or the first response 102(1). For example, the host device 106 may access data indicative of previous requests 112 sent by administrator devices 108, previous responses 102 sent by test devices 104, and so forth, which may indicate other requests 112 that are related to or associated with the first request 112(1) or first response 102(1). As another example, the host device 106 may access data indicative of requests 112 that are related to or associated with the first request 112(1) or first response 102(1), or one or more rules or algorithms that may be used to determine related or associated requests 112. Continuing the example, the first request 112(1) may request a list of shared libraries used by the test device 104, and the first response 102(1) may include the list of shared libraries. Based on the first response 102(1), the host device 106 may determine one or more subsequent requests 112 that relate to the libraries included in the list of shared libraries. As another example, the first request 112(1) may request a list of regions of memory used by the test device 104 to perform one or more functions, and the first response 102(1) may include addresses or other identifiers indicative of portions of memory. Based on the first response 102(1), the host device 106 may determine one or more subsequent requests 112 that request data stored in the regions of memory indicated in the first response 102(1). In some implementations, the subsequent requests 112 may indicate larger regions of memory than those indicated in the first response 102(1). For example, the first response 102(1) may indicate a region of memory having a size of 8000 bytes, while a subsequent request 112 may indicate a region of memory having a size of 64000 bytes that include the 8000 bytes referenced in the first response 102(1). Acquiring additional data not specifically indicated in the first response 102(1) and providing this data to the administrator device 108 may enable responses 102 to additional requests 112 determined by the administrator device 108 to be determined using the additional data. The host device 106 may determine any number and any type of subsequent requests 112 based on the content or other characteristics of the first request 112(1), the first response 102(1), or both the first request 112(1) and first response 102(1).

The host device 106 may provide subsequent requests 112 to the test device 104 using the wired connection 114, and receive responses 102 from the test device 104 using the wired connection 114, in an alternating manner. For example, the test device 104 may be configured to receive requests 112 and determine responses 102 based on the LLDB protocol, or another similar protocol. The host device 106 may therefore be configured to send an individual request 112 to the test device 104, receive a corresponding response 102, send a subsequent request 112, receive a subsequent response 102, and so forth. For example, FIG. 1A depicts the host device 106 sending a second request 112(2) to the test device 104, the test device 104 sending a second response 102(2) to the host device 106, the host device 106 sending a third request 112(3) to the test device 104, the test device 104 sending a third response 102(3) to the host device 106, and any number of additional requests 112(N) and additional responses 102(N) being exchanged by the host device 106 and test device 104 in a similar manner. In other implementations, the host device 106 may provide one or more requests 112 to the test device 104, or the test device 104 may provide one or more responses 102 to the host device 106, in parallel. For example, certain types of requests 112 or responses 102 may be sent independent of the LLDB protocol, or another similar protocol.

As shown in FIG. 1B, at a fifth time T5, the host device 106 may send, to the administrator device 108, the responses 102(2-N) received from the test device 104 in response to the additional requests 112(2-N) that were determined, and in some cases, data indicative of the additional requests 112(2-N) that were provided to the test device 104, using the network(s) 110. The transmission of the responses 102 and requests 112 by the host device 106 may be independent of the LLDB protocol, or other protocol used by the administrator device 108 and test device 104, or may include characteristics that enable the data to be recognized and stored by the administrator device 108 without affecting communication using the LLDB protocol. Therefore, the host device 106 may send each of the responses 102(2-N) and data indicative of the additional requests 112(2-N) as a single communication or set of sequential communications without necessarily receiving intervening communications from the administrator device 108. As a result, the number of transmissions between the host device 106 and administrator device 108 using the network(s) 110 may be reduced when compared to the transmission of each request 112 and response 102 individually, which may reduce the effect of the latency associated with the network(s) 110.

At a sixth time T6, the administrator device 108 may store the responses 102(2-N) and data indicative of the requests 112(2-N) received from the host device 106, such as in a cache or other data storage medium. For example, FIG. 1B depicts the administrator device 108 determining stored data 116 based on the data received from the host device 106. In some implementations, the stored data 116 may associate each received response 102 with data indicative of a corresponding request 112. For example, FIG. 1B depicts the stored data 116 associating the second response 102(2) with the second request 112(2), the third response 102(3) with the third request 112(3), and any number of additional responses 102(N) with corresponding additional requests 112(N). In other implementations, the stored data 116 may include data associated with the application memory of the test device 104, which may be stored independent of the additional requests 112(2-N). For example, the stored data 116 may represent an application state of the test device 104, and additional requests 112 determined by the administrator device 108 may be used to determine responses 102 based on the application state represented by the stored data 116.

At a seventh time T7, the host device 106 may send the first response 102(1) to the first request 112(1) to the administrator device 108 using the network(s) 110. Receipt of the response 102(1) to the initial request 112(1), that may be provided using the LLDB protocol or another similar protocol, may cause the administrator device 108 to determine a subsequent request 112 based on one or more of the first request 112(1) or the first response 102(1). For example, the first response 102(1) may indicate a list of shared libraries, a list of addresses for memory regions, and so forth. The administrator device 108 may determine a subsequent request 112 associated with a first of the indicated libraries or memory regions.

For example, at an eighth time T8, the administrator device 108 may determine one or more additional requests 112 based on one or more of the first request 112(1) or the first response 102(1). The additional requests 112 may be related to or associated with the first request 112(1), or the additional requests 112 may be determined based on the content or characteristics of the first response 102(1). A request determination module 118 associated with the administrator device 108 may use the subsequent requests 112 to query the stored data 116. In some implementations, each subsequent request 112 determined by the administrator device 108 may be associated with the LLDB protocol, or another similar protocol, and may therefore be used individually to query the stored data 116, and a response 102 for each request 112 may be determined before a subsequent request 112 is sent. For example, FIG. 1B depicts the request module 112(2) querying the stored data 116 using the second request 112(2) and determining the corresponding second response 102(2), querying the stored data 116 using the third request 112(3) and determining the corresponding third response 102(3), and querying the stored data 116 using any number of additional requests 112(N) and determining the additional corresponding responses 102(N). Because the stored data 116 is stored locally in association with the administrator device 108, minimal latency is incurred by determining each response 102, when compared to the latency that would otherwise be associated with transmitting each individual request 112 and response 102 using the network(s) 110.

In some implementations, if a response 102 to a request 112 determined by the administrator device 108 is not able to be determined using the stored data 116, the request determination module 118 or another module associated with the administrator device 108 may provide the request 112 to the host device 106 using the network(s) 110. The host device 106 may then provide the request 112 to the test device 104, which may determine a response 102 and provide the response to the host device 106. The host device 106 may then provide the response 102 to the administrator device 108. In some cases, the host device 106 may determine one or more additional requests 112 based on the received request 112 and corresponding response 102 and may provide these additional requests 112 to the test device 104, determine responses 102, and provide these determined responses 102 to the administrator device 108. Therefore, while FIGS. 1A and 1B depict the subsequent requests 112 determined by the host device 106 and the subsequent requests 112 determined by the administrator device 108 as identical, in other implementations, the administrator device 108 may determine additional requests 112 that were not determined by the host device 106 and thus not included in the stored data 116. Additionally, in some cases, the host device 106 may determine one or more requests 112 that may not be determined by the administrator device 108, and the stored data 116 may therefore include one or more requests 112 or responses 102 that are not accessed by the request determination module 118.

In some implementations, if a subsequent request 112 determined by the administrator device 108 is a type of request 112 that may cause data associated with the AUT to be changed, the administrator device 108 may send the request 112 to the host device 106 rather than use the stored data 116 to determine a response 102. In some cases, the administrator device 108 may also delete or prevent from use at least a portion of the stored data 116 that may correspond to regions of memory of the test device 104 that may be changed based on the request 112. The host device 106 may send the subsequent request 112 to the test device 104, receive a response 102, and provide the response 102 to the administrator device 108. In some cases, the host device 106 may determine one or more additional requests 112 based on the subsequent request 112 and corresponding response 102 and may provide these requests 112 to the test device 104, determine responses 102, and provide this data to the administrator device 108 in the manner described above with regard to the additional requests 112(2-N) and responses 102(2-N).

At a ninth time T9, the administrator device 108 may determine interface data 120 based on the data included in one or more of the responses 102 received from the host device 106 and may generate a user interface 122 based on the interface data 120. For example, a user interface 122 may present an indication of computational resources used by one or more test devices 104, device components used, amounts of data sent or received, metric values associated with the network(s) 110, video and audio data associated with execution of the AUT, and so forth.

Figure 2A:
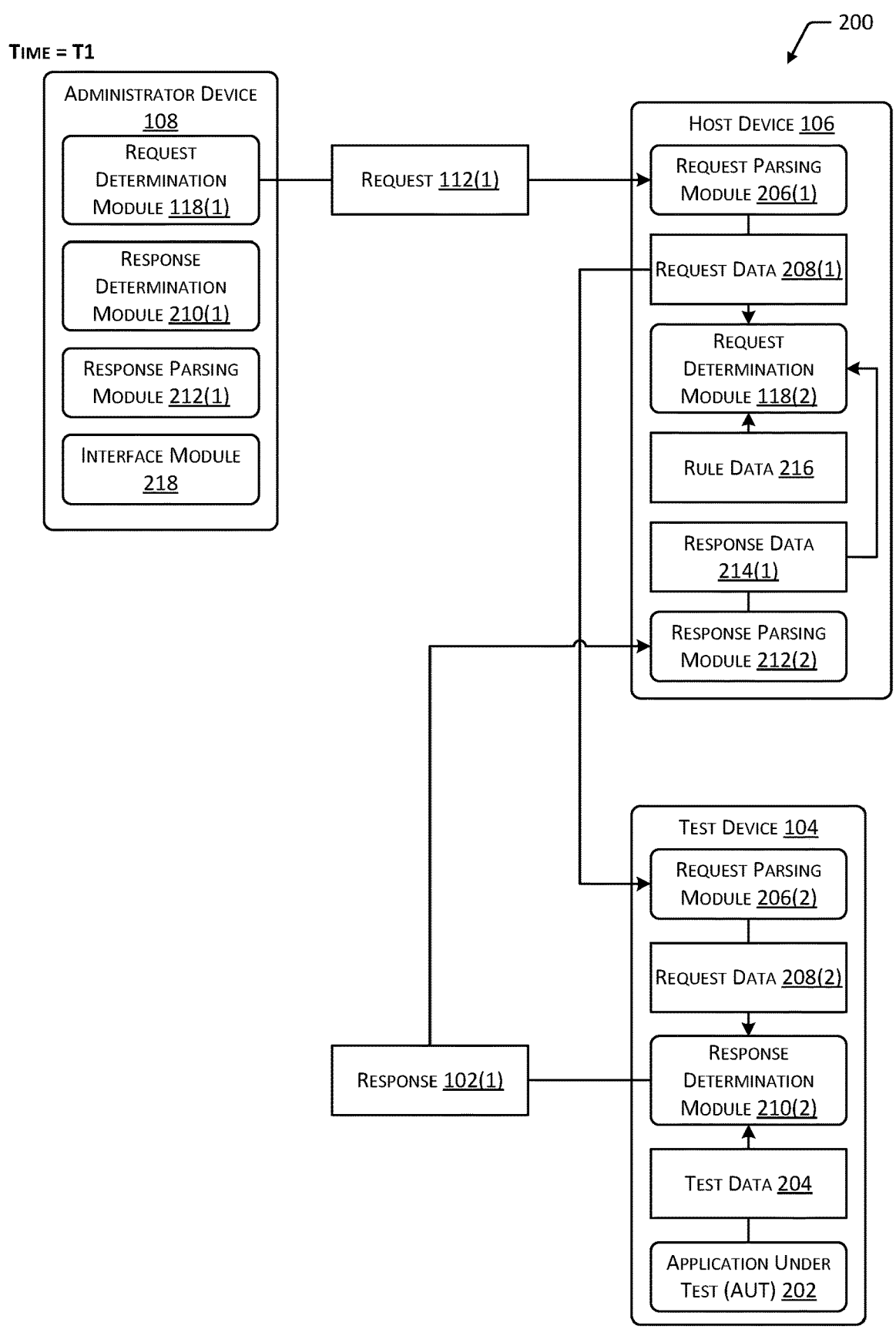
FIGS. 2A through 2D are a series of diagrams depicting implementations of computing devices for processing requests and responses based on data received from a test device.

FIGS. 2A through 2D are a series of diagrams 200 depicting implementations of computing devices for processing requests 112 and responses 102 based on data received from a test device 104. As shown in FIG. 2A, at a first time T1, a request determination module 118(1) associated with an administrator device 108 may determine a first request 112(1) associated with data generated or determined by a test device 104. For example, the test device 104 may execute an application under test (AUT) 202. Test data 204 may be generated by the AUT 202 or determined by the test device 104 based on characteristics of the AUT 202 or test device 104 during use of the AUT 202. The first request 112(1) may be associated with components or resources used by the test device 104, such as threads, memory, processor cycles, data, and so forth. For example, the first request 112(1) may request an indication of libraries used by the AUT 202, regions of memory of the test device 104 used by the AUT 202, processor threads of the test device 104 used by the AUT 202, and so forth.

As described with regard to FIGS. 1A and 1B, the administrator device 108 may send the first request 112(1) to the host device 106 using one or more networks 110. A request parsing module 206(1) associated with the host device 106 may determine request data 208(1) based on at least a portion of the request 112(1). For example, the request 112(1) may include one or more parameters, commands, terms, formats, compressions, or other characteristics that may be associated with a protocol, operating system, or other hardware or software components used by the administrator device 108. The request parsing module 206(1) may process the request 112(1) to determine request data 208(1) that may be used by the host device 106 to determine additional requests 112. In some implementations, the request data 208(1) may include one or more formats or other characteristics suitable for use by the test device 104 for determining responses 102.

The host device 106 may send at least a portion of the request data 208(1), or the request 112(1), to the test device 104. As described with regard to FIGS. 1A and 1B, the host device 106 may exchange data with the test device 104 using a wired connection 114. In other implementations, the host device 106 and test device 104 may communicate using one or more wireless networks, such as a LAN. A request parsing module 206(2) associated with the test device 104 may determine request data 208(2) based on the request data 208(1) or request 112(1) received from the host device 106. For example, the test device 104 may be configured to convert data from the host device 106 to other formats, compress or decompress the data, extract specific parameters from the received data, and so forth. In some cases, the test device 104 may be configured to process the received request data 208(1) or request 112(1) without performing additional functions to determine request data 208(2) based on the data received from the host device 106.

A response determination module 210(2) associated with the test device 104 may determine a first response 102(1) based on the request data 208(2) and the test data 204 associated with the AUT 202. For example, the test data 204 may indicate libraries, regions of memory, processor threads, or other resources associated with the AUT 202, performance metrics associated with the AUT 202 or test device 104, output associated with the AUT 202 and components of the test device 104, such as video data or audio data, and so forth. The first response 102(1) may include one or more portions of the test data 204, or other data determined based on the test data 204, that corresponds to the parameters of the request data 208(2). The test device 104 may provide the first response 102(1) to the host device 106.

A response parsing module 212(2) associated with the host device 106 may determine response data 214(1) based on the received response 102(1). For example, the response parsing module 212(2) may be configured to determine parameters, terms, components, or other particular portions of the response 102(1), to convert the response to a format associated with the host device 106 or administrator device 108, to compress or decompress the response 102(1), and so forth.

A request determination module 118(2) associated with the host device 106 may determine one or more additional requests 112 based on the response data 214(1) or the received response 102(1), and in some cases based on the request data 208(1) or the request 112(1) received from the administrator device 108. For example, rule data 216 may indicate additional requests 112 that are associated with or related to the first request 112(1), the request data 208(1), the first response 102(1), or the response data 214(1). In some implementations, the rule data 216 may include one or more rules for generating additional requests 112 based on the content of the first request 112(1) or first response 102(1). For example, the first response 102(1) may indicate a list of libraries used by the AUT 202, and the rule data 216 may indicate that subsequent requests 112 are to be generated that request access to or information regarding each of the libraries indicated in the first response 102(1). As another example, the first response 102(1) may include memory addresses for regions of memory of the test device 104 used by the AUT 202. The rule data 216 may indicate that subsequent requests 112 are to be generated that request data included in a region of memory of a selected size that includes the memory addresses indicated in the first response 102(1). For example, the first response 102(1) may include a memory address indicating a region having a size of 8000 bytes is associated with the AUT 202. The rule data 216 may indicate that a subsequent request 112 for data included in a region of memory having a size of 64000 bytes that includes the 8000 bytes indicated in the first response 102(1) is to be generated.

Figure 2B:
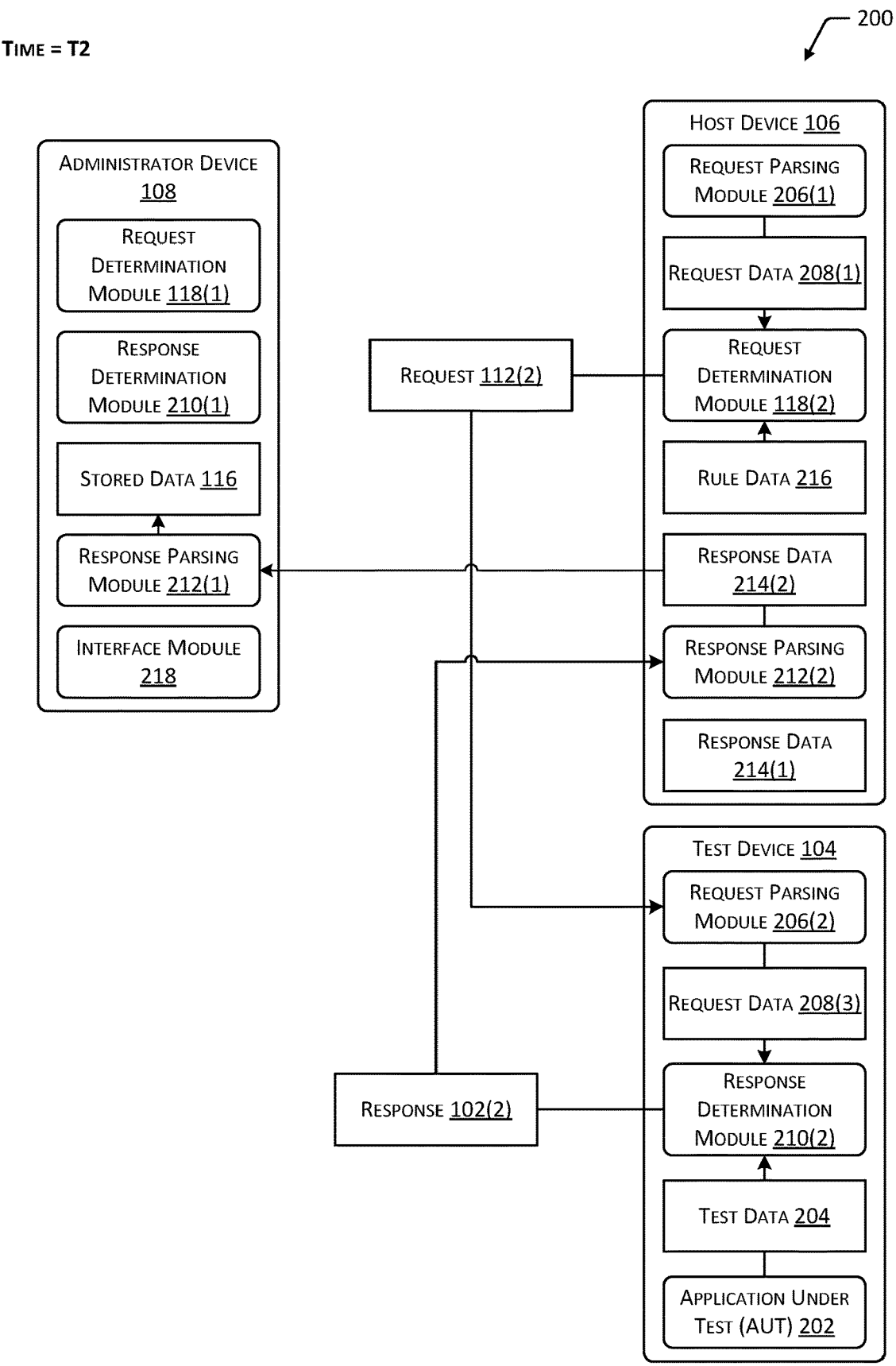

For example, as shown in FIG. 2B, at a second time T2, the request determination module 118(2) associated with the host device 106 may determine a second request 112(2), which may be provided to the test device 104. The parameters of the second request 112(2) may be determined based on one or more of the first request 112(1), request data 208(1), first response 102(1), response data 214(1), or rule data 216. Continuing the example, the second request 112(2) may indicate regions of memory, threads, libraries, or other resources indicated in the first response 102(1) received from the test device 104.

The request parsing module 206(2) associated with the test device 104 may determine request data 208(3) based on the request 112(2). For example, the test device 104 may determine particular terms, parameters, or other characteristics of the request 112(2) that may be processed or otherwise used by the test device 104 to determine a response 102. Continuing the example, the test device 104 may convert the second request 112(2) to a format usable by the test device 104, compress, decompress, encrypt, decrypt, or otherwise process the second request 112(2) to determine one or more parameters of thereof.

The response determination module 210(2) associated with the test device 104 may determine a second response 102(2) based on the request data 208(3) or received request 112(2) and the test data 204. For example, the second request 112(2) may request data associated with a region of memory of the test device 104 associated with a particular address, and the second response 102(2) may include the data associated with the indicated region of memory.

The response parsing module 212(2) associated with the host device 106 may determine response data 214(2) based on the second response 102(2), such as by determining or extracting one or more particular parameters, components, or types of data from the response 102(2), changing a format of the response 102(2), and so forth. In other implementations, the host device 106 may send the received response 102(2) to the administrator device 108 without determining additional response data 214(2). The host device 106 may send at least a portion of the response data 214(2) or the received response 102(2) to the administrator device 108. In some implementations, the host device 106 may also send data indicative of the second request 112(2) to the administrator device 108.

A response parsing module 212(1) associated with the administrator device 108 may determine stored data 116 based on the received response data 214(2) or response 102(2). For example, the response parsing module 212(1) may determine one or more portions of the received response data 214(2) or response 102(2), and in some cases data indicative of the second request 112(2), to be stored in a cache or other data storage medium, the format of the stored data 116, and so forth. The administrator device 108 may be configured to determine characteristics of the response data 214(2) that indicate the response data 214(2) is not associated with the response 102(1) to the first request 112(1). In response to the determined characteristics, the administrator device 108 may determine stored data 116 based on the response data 214(2) rather than determining a subsequent request 112. For example, if the administrator device 108 communicates using the LLDB protocol or another similar protocol, receipt of a response 102(1) to the first request 112(1) would typically cause the administrator device 108 to determine a subsequent request 112 to be provided. However, the response data 214(2) may be received independent of the exchange of alternating requests 112 and responses 102 associated with the protocol.

While FIG. 2B depicts the host device 106 sending a single additional request 112(2) to the test device 104, receiving a single additional response 102(2), and sending response data 214(2) based on the response 102(2) to the administrator device 108, in some implementations, the host device 106 may determine additional requests 112 based on data from the administrator device 108 or test device 104. For example, based on the first request 112(1) or first response 102(1), the host device 106 may determine multiple additional requests 112 to sequentially provide to the test device 104. Continuing the example, the first response 102(1) may indicate multiple addresses for regions of memory associated with the test device 104, and the host device 106 may determine multiple subsequent requests 112, each of which indicates a particular memory address. As another example, based on the second request 112(2) determined by the host device 106 or the second response 102(2) received from the test device 104, the host device 106 may determine one or more additional requests 112 that are associated with or related to the second request 112(2) or second response 102(2).

Figure 2C:
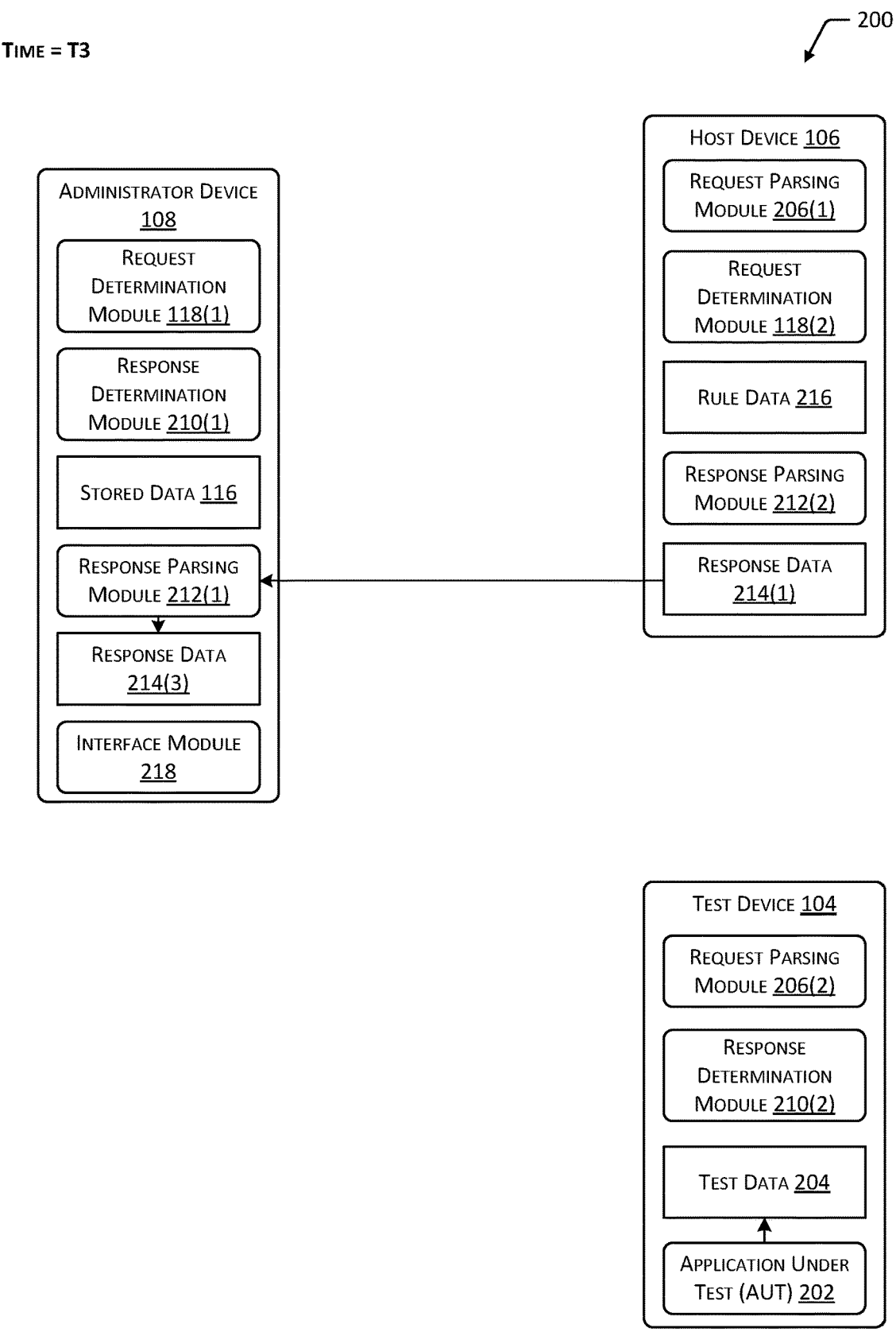

As shown in FIG. 2C, at a third time T3, the host device 106 may send the at least a portion of response data 214(1) determined based on the first response 102(1), or the first response 102(1), to the administrator device 108. The response parsing module 212(1) associated with the administrator device 108 may determine response data 214(3) based on the response data 214(1) or response 102(1) received from the host device 106. For example, the administrator device 108 may convert the response data 214(1) or response 102(1) to a different format or otherwise process or modify at least a portion of the response data 214(1) or response 102(1) to determine the response data 214(3).

Figure 2D:
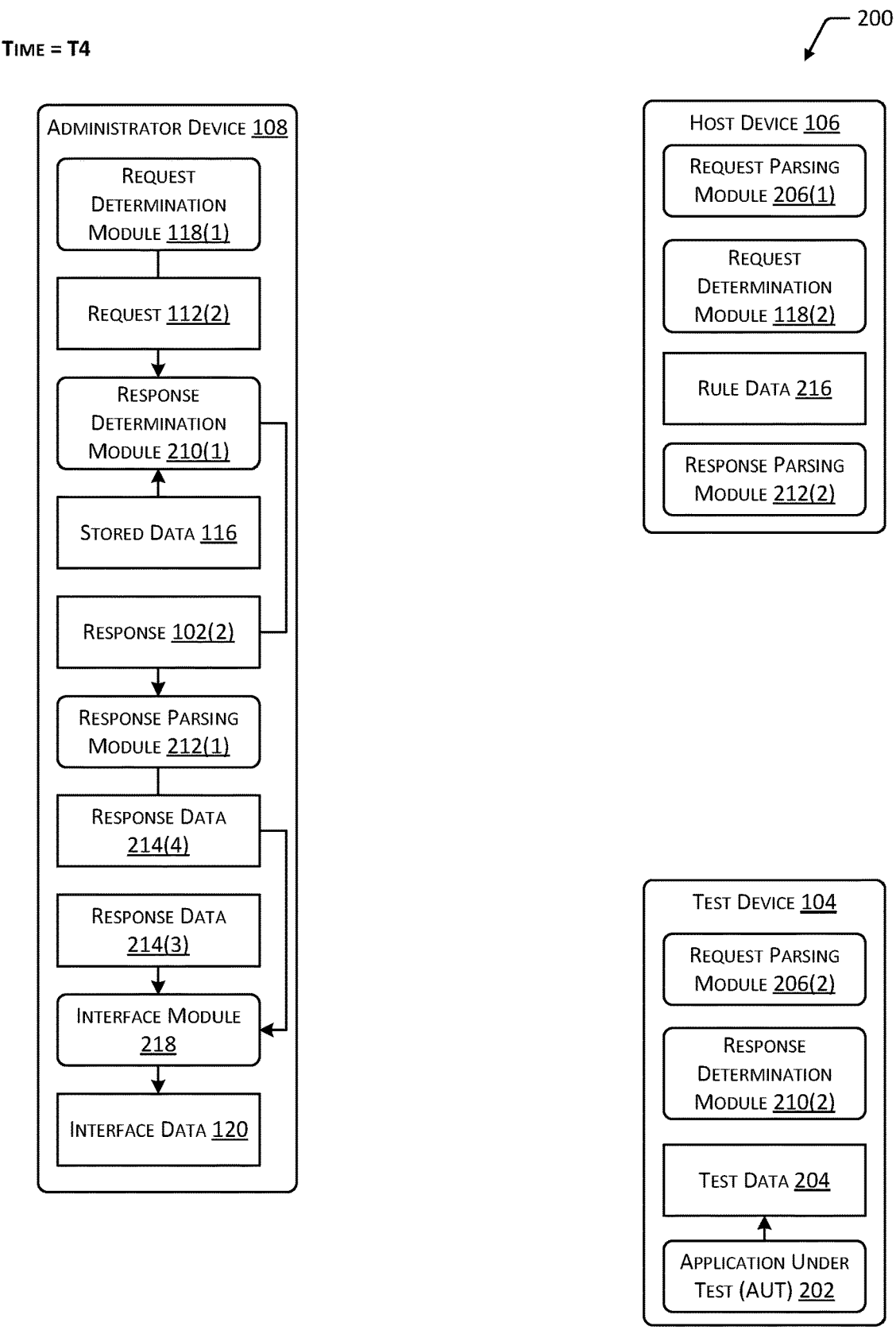

As shown in FIG. 2D, at a fourth time T4, the request determination module 118(1) associated with administrator device 108 may determine a subsequent request 112(2). For example, in response to the response data 214(3) or the received response 102(1), and in some cases based in part on the characteristics of the first request 112(1), the request determination module 118(1) may determine a related or associated request 112(2). Due to the use of the request determination module 118(2) and rule data 216 associated with the host device 106, and the exchange of requests 112(2) and responses 102(2) by the host device 106 and test device 104, a request 112(2) that is identical or similar to the request 112(2) determined by the administrator device 108 may have already been provided to the test device 104, and a corresponding response 102(2) determined. As such, the stored data 116 associated with the administrator device 108 may include data that may be used to determine a response 102(2) to the subsequent request 112(2).

A response determination module 210(1) associated with the administrator device 108 may determine a response 102(2) based on the request 112(2) and the stored data 116. For example, the second request 112(2) may indicate data associated with particular regions of memory indicated in the first response 102(1), and this data may have previously been sent from the host device 106 to the administrator device 108 and stored as stored data 116. Therefore, based on correspondence between at least a portion of the stored data 116 and the parameters of the request 112(2), the response determination module 210(1) may determine a response 102(2).

The response parsing module 212(1) associated with the administrator device 108 may determine response data 214(4) based on the response 102(2). For example, the response data 214(4) may be determined by extracting particular parameters of the response 102(2), changing a format of the response 102(2), compressing or decompressing the response 102(2), and so forth.

An interface module 218 associated with the administrator device 108 may determine interface data 120 based on the response data 214(3) associated with the initial response 102(1), and the response data 214(4) associated with the subsequent response 102(2). As described previously, in some implementations, one or more additional requests 112 may also be provided to the test device 104, and responses 102 may be determined, sent to the administrator device 108, and stored as stored data 116. Data associated with additional requests 112 and responses 102 may also be used to determine the interface data 120. As described with regard to FIGS. 1A and 1B, the interface data 120 may be used to present a user interface 122 that includes information regarding the AUT 202 or test device 104.

Figure 3:
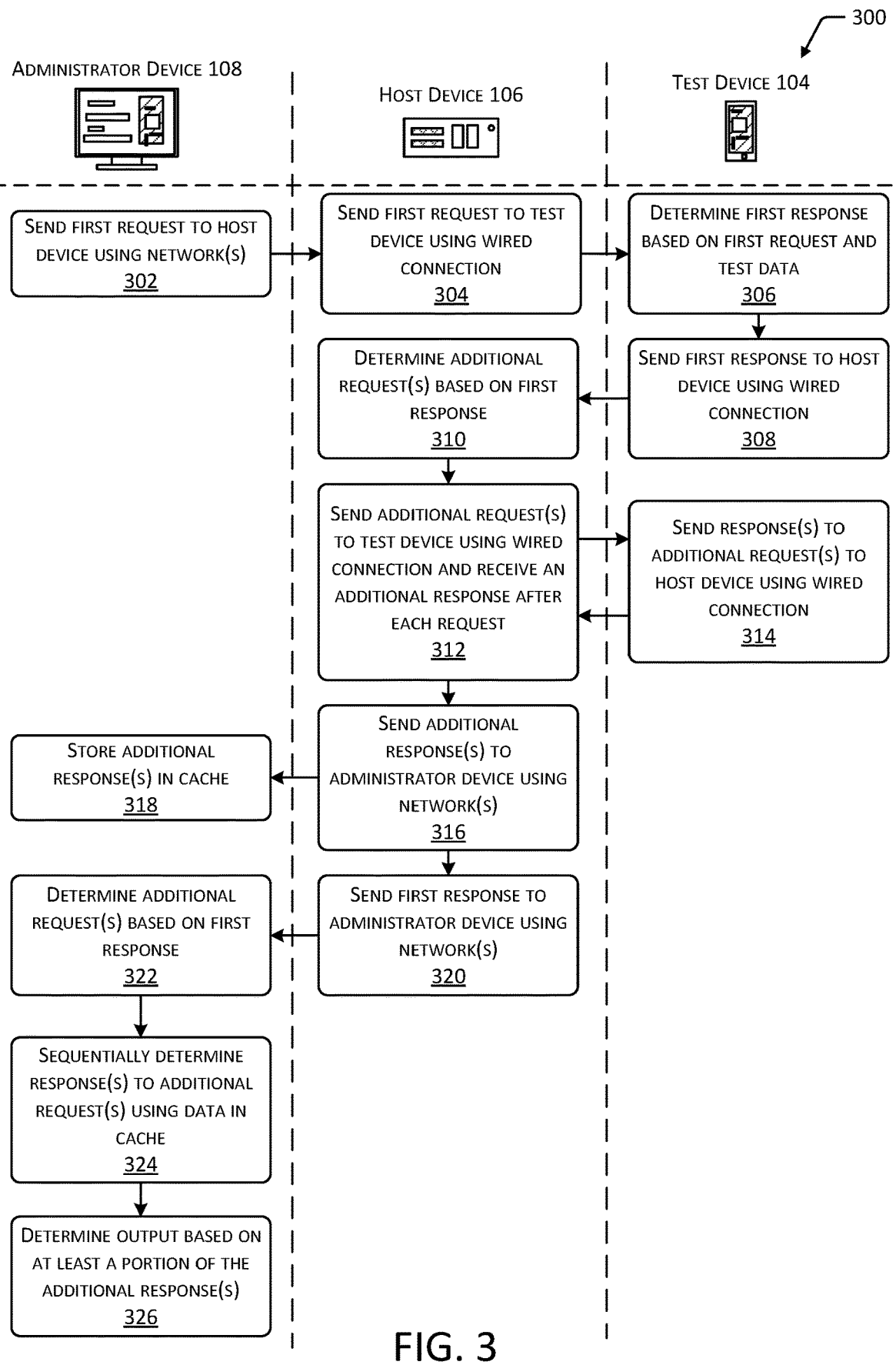
FIG. 3 is a flow diagram illustrating a process for providing data to an administrator device to enable the administrator device to determine responses to subsequent requests using locally stored data.

FIG. 3 is a flow diagram 300 illustrating a process for providing data to an administrator device 108 to enable the administrator device 108 to determine responses 102 to subsequent requests 112 using locally stored data 116. At 302, the administrator device 108 may send a first request 112 to a host device 106 using one or more networks 110. For example, the administrator device 108 may be located at a first geolocation, and may communicate with the host device 106 at a second geolocation using the Internet, or one or more wide area networks (WANs). In some implementations, the first request 112 may indicate resources associated with a test device 104 executing an AUT 202. For example, the first request 112 may request a list of libraries or other shared resources used by the test device 104 or AUT 202, a list of memory addresses indicating regions of memory used by an AUT 202 to perform one or more functions, registry values for processor threads used by the test device 104 to perform one or more functions associated with the AUT 202, and so forth. In some implementations, the administrator device 108 may communicate using the LLDB protocol, or another similar protocol, and as such, the administrator device 108 may refrain from determining and sending a subsequent request 112 until a response 102 to the first request 112 is received.

At 304, the host device 106 may send the first request 112 to the test device 104 using a wired connection 114. In other implementations, the host device 106 may communicate with the test device 104 using one or more wireless networks, such as a LAN. Communications between the host device 106 and test device 104 may be affected by a smaller amount of latency than communications between the administrator device 108 and the host device 106 or test device 104.

At 306, the test device 104 may determine a first response 102 based on the first request 112 and test data 204 associated with use of the AUT 202. For example, the test data 204 may indicate resources used by the test device 104 or AUT 202, output associated with the AUT 202, characteristics of output or resources that are associated with the AUT 202, and so forth. In some cases, the first response 102 may indicate other information. For example, the first response 102 may include a list of shared libraries associated with the AUT 202, a list of addresses for memory regions associated with the AUT 202, indications of processor threads associated with the AUT 202, and so forth.

At 308, the test device 104 may send the first response 102 to the host device 106 using the wired connection 114. In some implementations, the test device 104 may communicate using the LLDB protocol, or another similar protocol. As such, the test device 104 may refrain from accepting a subsequent request 112 until the first response 102 has been sent.

At 310, the host device 106 may determine one or more additional requests 112 based on the first response 102. For example, the host device 106 may access rule data 216 that indicates requests 112 that are associated with or related to the first request 112 or the first response 102. Continuing the example, the first response 102 may indicate a list of libraries, and the rule data 216 may indicate that subsequent requests 112 associated with at least a portion of the listed libraries are to be sent to the test device 104. As another example, the first response 102 may indicate a list of memory addresses, and the rule data 216 may indicate that subsequent requests 112 for blocks of data associated with the memory addresses having a selected size are to be sent to the test device 104.

At 312, the host device 106 may send additional request(s) 112 to the test device 104 using the wired connection 114 and receive an additional response 102 after each request 112. At 314, the test device 104 may send response(s) 102 to the additional request(s) 112 to the host device 106 using the wired connection. In some implementations, the host device 106 may sequentially send individual requests 112 to the test device 104, in response to which the test device 104 may sequentially send responses 102 to each request 112. For example, the test device 104 may communicate using the LLDB protocol, or another similar protocol, that requires requests 112 and responses 102 to be exchanged individually, in an alternating manner. Because the host device 106 may communicate with the test device 104 using a wired connection 114 or other method of communication that is not affected by significant latency, the host device 106 and test device 104 may exchange a potentially large number of requests 112 and responses 102 without incurring significant latency. In comparison, an exchange of the same requests 112 and responses 102 between the administrator device 108 and the test device 104 using the network(s) 110 may cause each individual communication to be affected by the latency associated with the network(s) 110. In other implementations, the host device 106 and test device 104 may non-sequentially exchange at least a portion of the requests 112 and responses 102. For example, certain types of requests 112, such as a file transfer request, may occur independent of the LLDB protocol, or other similar protocol, used by the test device 104. In such a case, certain types of requests 112 may be provided to the test device 104 without waiting for a response 102 to a previous request 112, and the test device 104 may provide responses 102 to the requests 112 independent of other requests 112 that have been received or responses 102 that have been sent.

At 316, the host device 106 may send the additional response(s) 102 to the administrator device 108 using the network(s) 110. Because the additional response(s) 102 do not include a response 102 to the first request 112, the administrator device 108 may receive the additional response(s) 102 independent of the LLDB protocol, or other similar protocol, used to send the first request 112. For example, the additional response(s) 102 may be associated with particular data characteristics that cause the administrator device 108 to store the additional response(s) 102.

At 318, the administrator device 108 may store the additional response(s) 102 in a cache or other type of data storage. For example, responses 102 that include data associated with application memory or processor threads of the test device 104 may be used to represent an application state of the AUT 202 as stored data 116 on the administrator device 108. As a result, subsequent responses 102 may be determined by the administrator device 108 using the stored data 116 without incurring the latency associated with exchanging communications with the test device 104.

At 320, the host device 106 may send the first response 102 to the first request 112 to the administrator device 108 using the network(s) 110. As described previously, the administrator device 108 may communicate using the LLDB protocol, or another similar protocol, and receipt of a response 102 to the first request 112 may cause the administrator device 108 to determine a subsequent request 112.

For example, at 322, the administrator device 108 may determine one or more additional requests 112 based on the first response 102. Continuing the example, the first response 102 may include a list of resources, such as libraries, memory addresses, processor threads, and so forth. The additional request(s) 112 determined by the administrator device 108 may include requests to access the listed resources. As such, one or more of the additional request(s) 112 determined by the administrator device 108 may be identical or similar to the additional request(s) 112 determined by the host device 106 at 310, and data suitable for determining one or more responses 102 to the additional request(s) 112 may be stored on the administrator device 108 as indicated at 318.

At 324, the administrator device 108 may sequentially determine response(s) 102 to additional request(s) 112 using data in the cache. For example, stored data 116 based on the additional response(s) 102 sent by the host device 106 to the administrator device 108 at 316 may include sufficient information to determine responses 102 to the additional requests 112. Continuing the example, the stored data 116 may represent an application state of the AUT 202 associated with the test device 104, and use of the stored data 116 to determine a response 102 may result in a response 102 that is identical or similar to a response 102 that would be determined if an additional request 112 was sent to the test device 104. In cases where the administrator device 108 uses the LLDB protocol, or another similar protocol, the administrator device 108 may determine a response 102 to each request 112 before using a subsequent request 112 to interrogate the stored data 116, such that requests 112 and responses 102 are determined in an alternating manner.

In some cases, use of stored data 116 by the administrator device 108 to determine responses 102 may enable the administrator device 108 to determine responses 102 to requests 112 that were not specifically determined by the host device 106. For example, in response to a first response 102 to the first request 112 that indicates a list of memory addresses, the host device 106 may send additional requests 112 for blocks of data associated with the test device 104 having a greater size than that indicated in the first response 102. As a result, the stored data 116 associated with the administrator device 108 may include additional information that may be used to determine responses 102 to requests 112 that were not determined by the host device 106. As another example, the administrator device 108 may determine a request 112 that is similar to a request 112 determined by the host device 106, but may differ in syntax, context, format, and so forth. While the request 112 determined by the administrator device 108 may not identically match a request 112 determined by the host device 106, the data stored by the administrator device 108 may be sufficient to determine a response 102 to the request 112 determined by the administrator device 108.

At 326, the administrator device 108 may determine output based on at least a portion of the additional response(s) 102. For example, the administrator device 108 may determine interface data 120 for causing presentation of a user interface 122 that includes information indicative of at least a portion of the determined response(s) 102.

Figure 4:
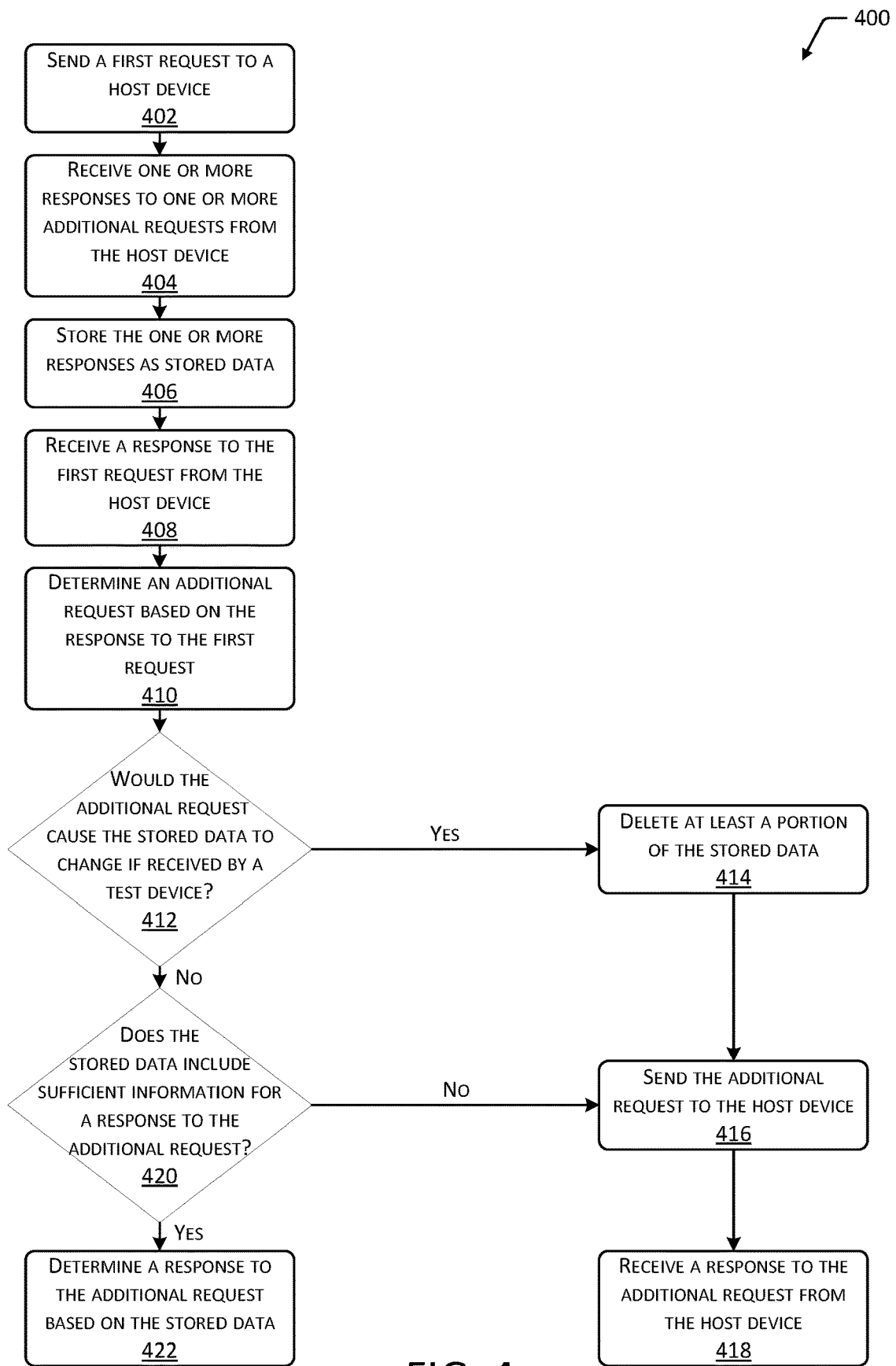
FIG. 4 is a flow diagram illustrating a process for using an administrator device to acquire data associated with a test device and to determine whether to use the acquired data to determine responses to requests.

FIG. 4 is a flow diagram 400 illustrating a process for using an administrator device 108 to acquire data associated with a test device 104 and to determine whether to use the acquired data to determine responses 102 to requests 112. At 402, a first request 112 may be sent to a host device 106. As described with regard to FIGS. 1-3, the first request 112 may request data associated with a test device 104 or an AUT 202 executed by the test device 104. The host device 106 may provide the first request 112 to the test device 104, receive a first response 102 from the test device 104, and determine one or more additional requests 112 based on one or more of the first request 112 or first response 102. For example, the additional request(s) 112 may be associated with or related to the first request 112 or the content of the first response 102, such as requests to access specific resources, such as libraries or memory addresses, indicated in the first response 102. The host device 106 may provide the additional request(s) 112 to the test device 102 and receive additional response(s) 102 based on the additional request(s) 102.

At 404, one or more responses 102 to one or more additional requests 112 may be received from the host device 106. For example, the host device 106 may provide the response(s) 102 to additional request(s) 112 that were sent to the test device 104 before providing the response 102 to the first request 112 that was sent by the administrator device 108.

At 406, the one or more responses 102 may be stored as stored data 116. For example, as described with regard to FIGS. 1-3, at least a portion of the data associated with the response(s) 102, or data determined based on at least a portion of the response(s) 102, may be stored in a cache or other data storage medium associated with the administrator device 108. At a subsequent time, the administrator device 108 may access the stored data 116, such as to determine responses 102 to additional requests 112, without incurring significant latency.

At 408, a response 102 to the first request 112 may be received from the host device 106. Based on one or more of the response 102 to the first request 112 or the first request 112 itself, the administrator device 108 may then determine one or more additional requests 112. For example, at 410, an additional request 112 may be determined based on the response 102 to the first request 112. Continuing the example, the additional request 112 may be associated with the content of the first response 102, such as a request to access a resource indicated in the first response 102.

At 412, a determination may be made whether the additional request 112 would cause the stored data 116 to change if the additional request 112 were received by a test device 104. For example, certain types of requests 112, such as requests 112 to read or access data, would not cause the data associated with the test device 104 to be changed. In such a case, use of the stored data 116 to determine a response 102 to an additional request 112 may result in determination of an accurate response 102 based on conditions associated with the test device 104 and AUT 202. However, other types of requests 112, such as requests 112 that include write commands or that may cause the test device 104 or AUT 202 to perform a function that may add, remove, or modify data, may cause data associated with the test device 104 or AUT 202 to be changed. In such a case, use of the stored data 116 to determine a response 102 may result in an inaccurate response 102 based on data that does not accurately reflect an application state for the AUT 202. In some implementations, the administrator device 108 may include a list or other data structure indicating types of requests 112 that are suitable for determining a response 102 based on the stored data 116, types of requests 112 that are unsuitable for determining a response 102 based on the stored data 116, or types of both suitable and unsuitable requests 112. Correspondence between the data structure and the determined additional request 112 may be used to determine whether the stored data 116 may be used to determine a response 102 to the additional request 112.

If the additional request 112 may cause the stored data 116 to change if the additional request 112 were received by a test device 104, the process may proceed to 414. At 414, at least a portion of the stored data 116 may be deleted, overwritten, changed to remove a reference to a memory location of least a portion of the data, or otherwise prevented from use. For example, if a request 112 may cause data associated with the test device 104 to change, then the stored data 116 may no longer be suitable for determining an accurate response 102 to future requests 112. In some implementations, all of the stored data 116 may be deleted or otherwise prevented from use. In other implementations, one or more portions of the stored data 116 associated with the additional request 112 may be deleted or otherwise prevented from use, while other portions of the stored data 116 are retained. In still other implementations, portions of stored data 116 may be overwritten or indicated for non-use without necessarily deleting the stored data 116.

At 416, after deleting at least a portion of the stored data 116, the additional request 112 may be sent to the host device 106. The host device 106 may send the additional request 112 to the test device 104, which may determine an additional response 102 and send the additional response to the host device 106. In some implementations, the host device 106 may determine one or more additional requests 112 based on the additional response 102, send the additional requests 112 to the test device 104, and receive further additional responses 102, which may be sent to the administrator device 108.

At 418, a response 102 to the additional request 112 may be received from the host device 106. In some implementations, based on the received response 102, the administrator device 108 may determine one or more subsequent requests 112. In other implementations, the administrator device 108 may determine one or more subsequent requests 112 based on the response 102 to the first request 112.

In cases where the additional request 112 may not cause the stored data 116 to change if the additional request 112 were received by a test device 104, the process may proceed from 412 to 420. At 420, a determination may be made whether the stored data 116 includes sufficient information to determine a response 102 to the additional request 112. For example, the stored data 116 may include information sufficient to determine a response 102 if the stored data 116 includes elements that correspond to the parameters of the additional request 112 that would be included in a response 102 if the test device 104 received the request 112. Continuing the example, the stored data 116 may include data from application memory associated with the test device 104 and may therefore represent a state of an application, which may be used to determine a response 102 that would be determined by the test device 104. In such cases, if the administrator device 108 determines a request 112 that is identical or similar to a request 112 that was determined by the host device 106, or determines a request 112 that is associated with the same or similar data that was provided in response to the requests 112 determined by the host device 106, the stored data 116 may include information sufficient to determine a response 102.

In such a case, at 422, a response 102 to the additional request 112 may be determined based on the stored data 116. Use of the stored data 116 to determine the response 102 may enable the administrator device 108 to determine the response 102 without being affected by the latency associated with communication with the host device 106 or test device 104 using one or more networks 110. In cases where the administrator device 108 determines multiple responses 102 based on the stored data 116, each request 112 and response 102 that is not exchanged with the host device 106 or test device 104 may avoid the latency that would otherwise have affected each individual communication.

In cases where the stored data 116 includes insufficient information to determine a response 102 to the additional request 112, the process may proceed to 416. At 416, the additional request 112 may be sent to the host device 106, which may send the additional request 112 to the test device 104 and receive a response 102 from the test device 104. At 418, the response 102 to the additional request 112 may be received from the host device 106.

The process illustrated in FIG. 4 may be repeated for each request 112 determined by the administrator device 108. For example, the host device 106 may determine related or associated requests 112 for multiple additional requests 112 or responses 102, and provide data indicative of each received response 102 to the administrator device 108. The administrator device 108 may determine additional requests 112 based on previous requests 112 and on received responses 102.

Figure 5:
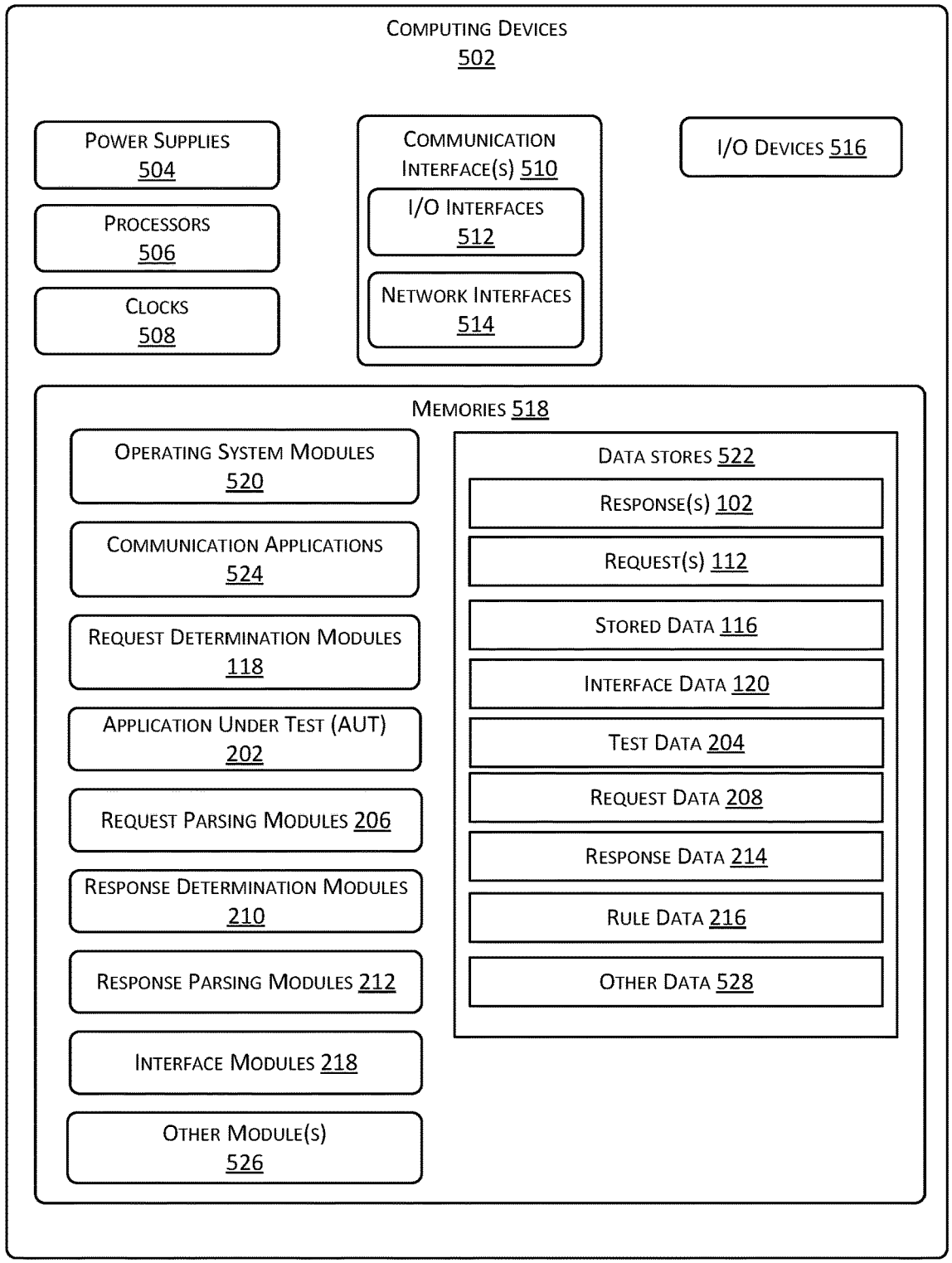
FIG. 5 is a block diagram illustrating an implementation of one or more computing devices within the present disclosure.

FIG. 5 is a block diagram 500 illustrating an implementation of one or more computing devices 502 within the present disclosure. The computing device(s) 502 may include one or more test devices 104, host devices 106, administrator devices 108, or other computing devices 502 in communication with a test device 104, host device 106, or administrator device 108. For example, while FIGS. 1-4 describe example systems in which various functions are performed by test devices 104, host devices 106, and administrator devices 108, other combinations of computing devices 502 may perform the functions that are described. Additionally, while FIGS. 1-4 depict and describe a single test device 104, host device 106, and administrator device 108, in some implementations, multiple computing devices 502 may be used to perform the functions described with regard to a single computing device 502. Additionally, in some implementations, a single computing device 502 may perform the functions described with regard to multiple computing devices 502. For example, a single computing device 502 may perform functions associated with both the test device 104 and host device 106 described with regard to FIGS. 1-4.

One or more power supplies 504 may be configured to provide electrical power suitable for operating the components of the computing devices 502. In some implementations, the power supplies 504 may include a rechargeable battery, fuel cell, photovoltaic cell, power conditioning circuitry, and so forth.

The computing devices 502 may include one or more hardware processor(s) 506 (processors) configured to execute one or more stored instructions. The processor(s) 506 may include one or more cores. One or more clock(s) 508 may provide information indicative of date, time, ticks, and so forth. For example, the processor(s) 506 may use data from the clock 508 to generate a timestamp, trigger a preprogrammed action, and so forth.

The computing devices 502 may include one or more communication interfaces 510, such as input/output (I/O) interfaces 512, network interfaces 514, and so forth. The communication interfaces 510 may enable the computing devices 502, or components of the computing devices 502, to communicate with other computing devices 502 or components of the other computing devices 502. The I/O interfaces 512 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 512 may couple to one or more I/O devices 516. The I/O devices 516 may include any manner of input devices or output devices associated with the computing devices 502. For example, I/O devices 516 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 516 may be physically incorporated with the computing devices 502. In other implementations, I/O devices 516 may be externally placed.

The network interfaces 514 may be configured to provide communications between the computing devices 502 and other devices, such as the I/O devices 516, routers, access points, and so forth. The network interfaces 514 may include devices configured to couple to one or more networks 110 including local area networks (LANs), wireless LANs (WLANs), wide area networks (WANs), wireless WANs, and so forth. For example, the network interfaces 514 may include wired and wireless communication interfaces, such as devices compatible with Ethernet, Wi-Fi, Bluetooth, ZigBee, Z-Wave, 3G, 4G, 5G, LTE, and so forth.

The computing devices 502 may include one or more buses or other internal communications hardware or software that allows for the transfer of data between the various modules and components of the computing devices 502.

As shown in FIG. 5, the computing devices 502 may include one or more memories 518. The memories 518 may include one or more computer-readable storage media (CRSM). The CRSM may be any one or more of an electronic storage medium, a magnetic storage medium, an optical storage medium, a quantum storage medium, a mechanical computer storage medium, and so forth. The memories 518 may provide storage of computer-readable instructions, data structures, program modules, and other data for the operation of the computing devices 502. A few example modules are shown stored in the memories 518, although the same functionality may alternatively be implemented in hardware, firmware, or as a system on a chip (SoC). In some implementations, the functionality described with regard to one or more of the modules may be incorporated within a software development kit (SDK), may be performed using one or more APIs, and so forth.

The memories 518 may include one or more operating system (OS) modules 520. The OS modules 520 may be configured to manage hardware resource devices such as the I/O interfaces 512, the network interfaces 514, the I/O devices 516, and to provide various services to applications or modules executing on the processors 506. The OS modules 520 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 522 and one or more of the following modules may also be associated with the memories 518. The modules may be executed as foreground applications, background tasks, daemons, and so forth. The data stores 522 may use a flat file, database, linked list, tree, executable code, script, or other data structure to store information. In some implementations, the data stores 522 or a portion of the data stores 522 may be distributed across one or more other devices including other computing devices 502, network attached storage devices, and so forth.

One or more communication applications 524 may be configured to establish communication between computing devices 502. Communications may be authenticated, encrypted, and so forth. In some implementations, communication may be established between computing devices 502 by determining sets of communication parameters, such as protocols, types or formats of data, networks 110, and routes for transmission of data that may be used by computing devices 502 when sending or receiving data. For example, a first computing device 502 may determine one or more first sets of communication parameters that may be used to exchange data with a second computing device 502, and the second computing device 502 may determine one or more second sets of communication parameters that may be used to exchange data with the first computing device 502. A set of communication parameters that is common between the sets determined by each computing device 502 may then be used to establish communication. In some implementations, the communication applications 524 may determine one or more communication parameters that are unavailable from use due to a firewall or other type of security feature, and the set of communication parameters that is determined for use may exclude communication parameters prevented from use by a security feature. In some implementations, if multiple sets of communication parameters may be used, a set of communication parameters may be selected for use based on one or more metric values indicative of latency, data throughput, or other characteristics of communication between computing devices 502. Example methods for establishing communication between computing devices 502 are described with regard to U.S. patent application Ser. No. 17/179,136, incorporated by reference previously.

The memories 518 may also store one or more applications under test 202 (AUT). An AUT 202 may include code or other types of computer-executable instructions that may cause a device to perform one or more functions. In some implementations, the functions may be associated with one or more I/O devices 516, such as acquiring data using a camera or microphone, or presenting output using a display or speaker. Functions may also include generation, processing, or presentation of data. Characteristics of the data associated with a computing device 502 executing the AUT 202 may be used to determine performance of the AUT 202 or of the computing device 502 under various conditions. For example, a particular function of the AUT 202 may be recorded over time, and the network conditions, device conditions, and other factors that may affect performance of the AUT 202 at particular times may also be determined. Continuing the example, components of computing devices 502, regions of memory used, processor threads, and so forth may be determined while an AUT 202 is used by a computing device 502. An interface or another type of output may be presented that associates performance of the AUT 202 with times at which the performance occurred and other characteristics of the AUT 202, computing device 502 that executed the AUT 202, network 110 accessed by the computing device 502 that executed the AUT 202, and so forth.

The memories 518 may also include one or more request determination modules 118. Request determination modules 118 may determine a request 112 to be sent to a computing device 502 based on characteristics of the computing device 502, AUT 202, network(s) 110, or based on data received from or determined by a computing device 502, such as a request 112 that was determined previously or a response 102 that was determined previously. For example, based on a response 102 that includes a list of libraries associated with an AUT 202, the request determination module 118 may determine one or more requests 112 associated with the libraries indicated in the response 102.

The memories 518 may additionally include one or more request parsing modules 206. Request parsing modules 206 may determine parameters, commands, terms, formats, compressions, or other characteristics associated with a received request 112. For example, a request parsing module 206 may process a request 112 to determine request data 208 having a format or other characteristic that may be used by a computing device 502 to determine a response 102 or additional request 112.

The memories 518 may also include one or more response determination modules 210. Response determination modules 210 may determine a response 102 based on the characteristics of a received request 112 and one or more characteristics of the computing device 502, AUT 202, or data stored in association with the computing device 502. For example, test data 204 determined based on use of an AUT 202, or stored data 116 based on responses 102 received from another computing device 502, may be used to determine a response 102 based on a received request 112. Continuing the example, test data 204 or stored data 116 may indicate libraries, regions of memory, processor threads, or other resources associated with the AUT 202, performance metrics associated with the AUT 202 or test device 104, output associated with the AUT 202 and components of the test device 104, such as video data or audio data, and so forth. A request 112 may indicate one or more elements of the test data 204 or stored data 116, and correspondence between parameters of the request 112 and the test data 204 or stored data 116 may be used to determine a response 102.

The memories 518 may include one or more response parsing modules 212. Response parsing modules 212 may determine characteristics, parameters, terms, formats, and so forth associated with a received response 102. For example, a response parsing module 212 may determine response data 214 based on a response 102, the response data 214 having a format or other characteristic that may be used by a computing device 502 to determine interface data 120 or another type of output, a subsequent request 112, an additional or related response 102, and so forth.

The memories 518 may additionally include one or more interface modules 218. Interface modules 218 may determine interface data 120 or one or more other types of output based on one or more of responses 102, response data 214, requests 112, request data 208, stored data 116, or rule data 216. For example, interface data 120 may be used to present a user interface 122 indicative of conditions associated with a test device 104, AUT 202, or network 110, performance metrics associated with the test device 104 or AUT 202, output presented by a test device 104, components or resources used by a test device 104, and so forth.

Other modules 526 may also be present in the memories 518. For example, other modules 526 may include logging modules for determining log data based on characteristics of one or more computing devices 502 or networks 110 during performance of functions associated with an AUT 202. Other modules 526 may also include encryption modules to encrypt and decrypt communications between computing devices 502, authentication modules to authenticate communications sent or received by computing devices 502, a permission module to assign, determine, and manage user permissions to access or modify data associated with computing devices 502, and so forth.

Other data 528 within the data stores 522 may include configurations, settings, preferences, and default values associated with computing devices 502. Other data 528 may also include encryption keys and schema, access credentials, threshold data, and so forth. Other data 528 may additionally include rules or criteria for determining when to cause devices to perform functions, such as execution of an AUT 202 or performance of other functions, transmission of data, and so forth.

In different implementations, different computing devices 502 may have different capabilities or capacities. For example, host devices 106, such as servers, may have greater processing capabilities or data storage capacity than test devices 104, such as smartphones.

Figure 6:
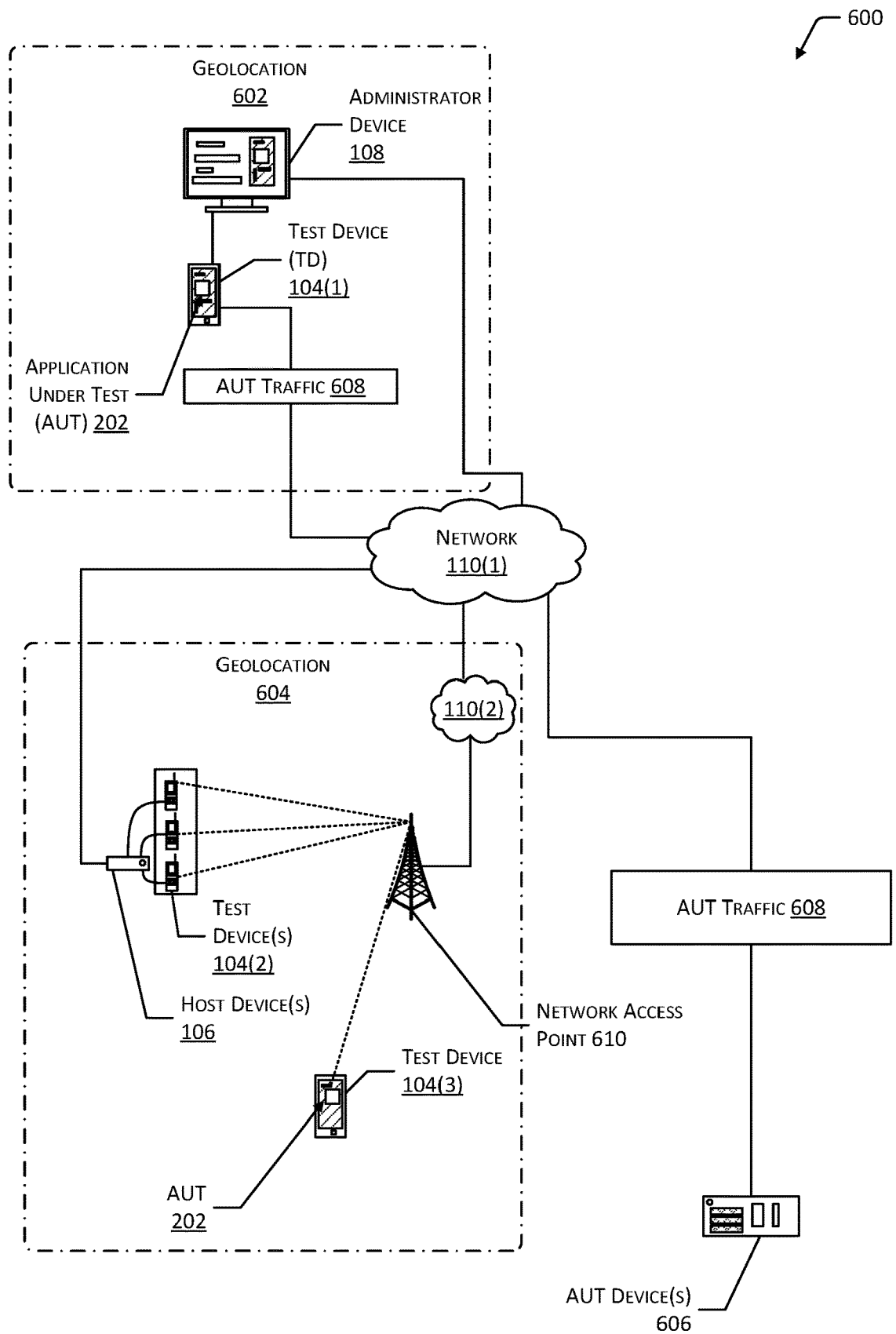
FIG. 6 is a diagram depicting an implementation of a system for testing an application under test (AUT) using test devices at various locations.

FIG. 6 is a diagram 600 depicting an implementation of a system for testing an application under test (AUT) 202 using test devices 104 at various locations. An AUT 202 may be executed on one or more different types of computing devices 502, such as smartphones, laptop computers, tablet computers, wearable computing devices, embedded devices, desktop computers, computing devices associated with vehicles, servers, computing devices associated with appliances or media devices, set top box devices, smart televisions, networked speaker devices, and so forth. For example, a test device 104 may include a smartphone or other type of computing device 502 in wired or wireless communication with an administrator device 108 or host device 106. When executing the AUT 202, a test device 104 may present an output, acquire an input, generate data, receive or process data, and so forth. The AUT 202 may include an application that is at any stage in a development or maintenance lifecycle. In some implementations, the test device(s) 104, host device(s) 106, administrator device(s) 108, or one or more other computing devices 502 in communication with a test device 104 may include an integrated development environment (IDE) to facilitate the creation and editing of program code, debugging, compiling, and so forth.

In some implementations, a test device 104, host device 106, administrator device 108, or other computing device(s) 502 may include an emulator or simulator that is designed to execute the AUT 202 as though the AUT 202 were executing on another piece of hardware, using a different operating system, and so forth. For example, a test device 104 on which the AUT 202 is executed may be located at a first geolocation 602, which may be geographically separate from a second geolocation 604. The first geolocation 602 and second geolocation 604 may include any type of geographic location, such as a particular room, building, city, state, country, and so forth. For example, a geographic location may be specified by a set of coordinates with regard to latitude and longitude on the surface of the Earth.

Different test devices 104, host devices 106, and administrator devices 108 may be connected to different networks 110. For example, a first test device 104(1) may communicate with the administrator device 108 using a wired connection 114 or a wireless network such as a LAN. The first test device 104(1) and administrator device 108 may communicate with a first network 110(1) which may, in turn, be connected to or be part of a larger network. For example, the first network 110(1) may comprise the Internet, or the first network 110(1) may include another network that is in communication with the Internet. The connection used by the first test device 104(1) and administrator device 108 may include, without limitation, a wired Ethernet connection, a wireless local area network (WLAN) connection such as Wi-Fi, and so forth. For example, the first geolocation 602 may include an office, and the first test device 104(1) may connect to a local Wi-Fi access point that is connected via an Ethernet cable to a router. The router, in turn, may be connected to a cable modem that provides connectivity to the Internet. During operation, the AUT 202 may cause the first test device 104(1) to access one or more external resources. For example, external resources may be stored in association with one or more AUT devices 606. The AUT device(s) 606 may include any number and any type of computing devices 502 including, without limitation, the types of computing devices 502 described with regard to the test device 104, host device 106, or administrator device 108.

The AUT 202 may access, generate, transmit, or receive data. For example, the AUT 202 may cause AUT traffic 608 to be exchanged with one or more AUT devices 606 or other computing devices 502 during operation. Traditionally, AUT traffic 608 associated with the first test device 104(1) at the first geolocation 602 would be sent to the first network 110(1), and then to the AUT device(s) 606. However, this traditional situation may only enable test data 204 to be generated based on the conditions associated with the first geolocation 602 and first network 110(1). For example, the characteristics of other networks or devices located at other geolocations may cause generation of test data 204 indicative of different characteristics of an output presented by a test device 104, conditions of a network 110, performance of a test device 104, resources used by a test device 104 or AUT 202, and so forth. However, this information may not be discoverable using test data 204 that is associated only with the first geolocation 602 and first network 110(1).

To enable the AUT 202 to be tested under conditions associated with different locations, such as the second geolocation 604, and different networks 110(2), a software development kit (SDK) may be incorporated into the AUT 202. In other implementations, techniques other than an SDK may be used to provide the functionality described herein. For example, lines of computer code that provide the functionality of at least a portion of the SDK may be incorporated into the code base of the AUT 202. The SDK may provide a user interface that allows for the redirection of the AUT traffic 608. For example, the SDK may include instructions to establish communication with one or more host devices 106, such as servers or other computing devices 502, which may include modules for coordinating the activities of other test devices 104(2) and analyzing data determined from the test devices 104(2). As described with regard to FIGS. 1-5, host device(s) 106 may determine responses 102 indicative of test data 204 associated with performance of an AUT 202 or of a test device 104(2) executing the AUT 202. For example, test data 204 may be indicative of video or audio quality or other characteristics of an output presented by a test device 104(2), data indicative of network conditions, data indicative of the particular functions performed by a test device 104(2) or components of the test device 104(2) that are used while executing the AUT 202, data relating to power or computational resources used by a test device 104(2) to perform various functions, and so forth.

FIG. 6 depicts a host device 106 in wired communication with a set of second test devices 104(2). In one implementation, the host device 106 may include a server, desktop computer, tablet, or other type of computing device to which multiple test device(s) 104(2) are connected using a wired connection 114, such as a cable connecting each test device 104(2) to a USB port of the host device 106. While FIG. 6 depicts a single host device 106 and three connected test device(s) 104(2), any number of host devices 106 and test devices 104(2) may be used. In some implementations, host devices 106 and test devices 104(2) may be placed in an enclosure at the second geolocation 604 to prevent unauthorized access to the devices or unauthorized transmission of content presented using the devices to individuals outside of the enclosure.

The host device 106 may coordinate the activities of the test device(s) 104(2), send requests 112 to the test device(s) 104(2), receive responses 102 from the test device(s) 104(2), and so forth. The host device 106 may communicate using the first network 110(1), such as to exchange data with the administrator device 108. The test device(s) 104(2) may connect to a network access point 610 that provides connectivity to a second network 110(2). Use of the test device(s) 104(2) to perform functions associated with an AUT 202 may therefore enable data regarding performance of the functions to be determined when different types of devices are used, and when a second network 110(2) having different characteristics than the first network 110(1) is used. For example, the test device(s) 104(2) may include commodity cellphones, the network access point(s) 610 may include cell phone towers, and the second network 110(2) may include a WWAN, such as a wireless cellular data network (WCDN). The second network 110(2) may in turn communicate with the first network 110(1). For example, a WCDN operated by a telecommunication company may interconnect or have a peering agreement with an Internet backbone provider. As a result, a user of the second network 110(2) may be able to access resources on the first network 110(1), and vice versa. In some implementations, the test device(s) 104(2) may be capable of communication with the AUT device(s) 606 or other devices using the second network 110(2) or another network, such as a cellular network, without communicating using the first network 110(1).

The second test device(s) 104(2) may be located at the second geolocation 604, which may be geographically removed from the first geolocation 602 where the first test device 104(1) is located. For example, the second test device(s) 104(2) may be located in another city, state, country, and so forth that differs from the location of the first test device 104(1). As part of the testing process for the AUT 202, a user interface 122 may be presented to enable a user at the first geolocation 602 to select one or more of a particular geolocation, such as the second geolocation 604, or particular test device 104 to use during testing. The host device(s) 106 or administrator device 108 may maintain information about the test device(s) 104, such as geolocation, availability, cost, characteristics of the test devices 104, and so forth.

In some implementations, during testing, the AUT traffic 608 may be routed through the first network 110(1) to the host device 106, then through a test device 104(2) to the second network 110(2), and then on to the first network 110(1) to ultimately arrive at the AUT device 606. The AUT traffic 608 may include outbound application traffic sent from the AUT 202 to the AUT device 606 and inbound application traffic sent from the AUT device 606 to the AUT 202. In some cases, at least a portion of the AUT traffic 608 may include test data 204 indicative of an output presented by a device, input received by the device, computational resources or components used by a device, characteristics of a network 110 used by a device, and so forth.

In some implementations, during operation, the AUT 202 may direct outbound application traffic to the host device 106, which may transfer the outbound application traffic to the test device 104(2), which may then send the outbound application traffic to the second network 110(2). The second network 110(2) may send the outbound application traffic to the AUT device 606. Inbound application traffic from the AUT device 606 may follow the reverse path. The test device(s) 104, host device(s) 106, administrator device(s) 108, or one or more other devices, such as devices executing the SDK, may collect the test data 204 or other log data associated with operation of the system, such as information associated with operation of the test device 104(2), packet capture of data transferred by the host device 106, and so forth. For example, test data 204 may indicate, for a particular instant in time, one or more of: a current page on a website, type of network 110 to which a test device 104(2) is connected, quantity of data received, quantity of data transmitted, latency to the AUT device 606, data throughput, received signal strength, transmit power, cost associated with data transfer on the second network 110(2), and so forth. Test data 204 may be determined by providing requests 112 to a test device 104 and receiving a response 102 indicative of at least a portion of the test data 204. The data collected by the host device(s) 106 or administrator device(s) 108 may therefore represent the AUT 202 operating on a real-world second network 110(2) at a desired geolocation, such as the second geolocation 604. In some implementations, test data 204 indicative of operation of the AUT 202 may be used to generate an interface indicative of characteristics of input received by a device executing the AUT 202, output presented by such a device, computational resources used by the device, and so forth. For example, the administrator device 108 may receive responses 102 indicative of the test data 204 and may present an interface based on at least a portion of the received response(s) 102.

In some implementations, instead of, or in addition to data determined by the host device(s) 106, one or more test devices 104(3) deployed at the second geolocation 604 may determine and provide test data 204, or responses 102 indicative of the test data 204, to the host device(s) 106 or administrator device 108. For example, the test device 104(3) at the second geolocation 604 may execute the AUT 202 or may communicate with another computing device 502 that executes the AUT 202.

Data determined by operation of test devices 104, host devices 106, administrator devices 108, and so forth may be used to generate interfaces, reports, determine modifications to the AUT 202, and so forth. In some cases, a host device 106 and test device 104(2) at a particular geolocation may not be present, or may not be usable to execute a particular AUT 202. In such a case, a test device 104 that wirelessly communicates with a host device 106 or administrator device 108 may enable execution of the AUT 202 at a desired geolocation to be tested. Additionally, in some cases, a device executing the AUT 202 may output or store proprietary information. In such a case, a test device 104 carried by an authorized user may be more secure than devices stored at a location. In other cases, a secure test device 104 may be configured to preserve the privacy of the data. For example, an SDK that is incorporated within a device may be used to determine test data 204 and other data regarding execution of an AUT 202 while preventing access to data associated with the AUT 202 to users or other devices.

In different implementations, different computing devices 502 may have different capabilities or capacities. For example, host devices 106, such as servers, may have greater processing capabilities or data storage capacity than test devices 104, such as smartphones.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EE-PROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more first hardware processors to execute first computer-executable instructions to:
receive a first request from a first computing device, wherein the first request is indicative of one or more of a second computing device or an application associated with the second computing device;
send one or more of the first request or data indicative of the first request to the second computing device;
receive a first response from the second computing device;
determine a second request based on one or more of the first request or the first response;
send the second request to the second computing device;
receive a second response from the second computing device;
send one or more of the second response or data indicative of the second response to the first computing device; and
send one or more of the first response or data indicative of the first response to the first computing device.

2. The system of claim 1, further comprising:
a wired communication interface; and
a wireless communication interface;
wherein one or more of the wired communication interface or the wireless communication interface is used to:
receive the first request,
send the one or more of the second response or the data indicative of the second response, and
send the one or more of the first response or the data indicative of the first response; and wherein the wired communication interface is used to:
send the one or more of the first request or the data indicative of the first request;
send the second request; and
receive the second response.

3. The system of claim 1, wherein:
the one or more first hardware processors are associated with a third computing device,
the third computing device communicates with the second computing device using a first communication method associated with a first latency,
the first computing device is in communication with the second computing device using a wireless network associated with a second latency, and
the second latency is greater than the first latency.

4. The system of claim 1, wherein:
the one or more first hardware processors are associated with a third computing device,
the third computing device is within a threshold distance of the second computing device, and
the first computing device is at a distance greater than the threshold distance from the second computing device.

5. The system of claim 1, wherein the one or more of the second response or the data indicative of the second response is sent to the first computing device before the one or more of the first response or the data indicative of the first response is sent to the first computing device.

6. The system of claim 1, further comprising first computer-executable instructions to:
determine a third request based on one or more of: the first request, the first response, the second request, or the second response;
send the third request to the second computing device;
receive a third response from the second computing device; and
send one or more of the third response or data indicative of the third response to the first computing device.

7. The system of claim 6, wherein:
the one or more of the second response or the data indicative of the second response is sent to the first computing device before the one or more of the first response or the data indicative of the first response is sent to the first computing device, and
the one or more of the third response or the data indicative of the third response is sent to the first computing device before the one or more of the first response or the data indicative of the first response is sent to the first computing device.

8. The system of claim 6, wherein the one or more of the second response or the data indicative of the second response and the one or more of the third response or the data indicative of the third response are sent to the first computing device as a single transmission.

9. The system of claim 1, wherein the first response includes an indication of one or more first memory regions associated with the second computing device, the system further comprising first computer-executable instructions to:
include an indication of one or more second memory regions in the second request, wherein the one or more second memory regions includes at least one memory region not included in the one or more first memory regions, and the second response includes data associated with the at least one memory region.

10. A system comprising:
one or more first hardware processors to execute first computer-executable instructions to:
send a first request to a first computing device, wherein the first request indicates one or more of a second computing device or an application associated with the second computing device;
receive a second response from the first computing device, wherein the second response is associated with a second request;
store at least a portion of the second response as stored data;
receive a first response from the first computing device, wherein the first response is associated with the first request;
determine one or more of the second request or a third request based on one or more of the first request or the first response; and
determine, based on the stored data, one or more of the second response or a third response to the third request.

11. The system of claim 10, further comprising first computer-executable instructions to:
determine a fourth request based on one or more of the first request, the first response, the second request, the second response, the third request, or the third response;
determine a lack of correspondence between the fourth request and the stored data;
in response to the lack of correspondence, send the fourth request to the first computing device; and
receive a fourth response from the first computing device.

12. The system of claim 10, further comprising first computer-executable instructions to:
determine a fourth request based on one or more of the first request, the first response, the second request, the second response, the third request, or the third response;
determine that the fourth request is associated with a modification to the stored data;
in response to the fourth request being associated with the modification to the stored data, send the fourth request to the first computing device; and
receive a fourth response from the first computing device.

13. The system of claim 10, further comprising first computer-executable instructions to:
determine a fourth request based on one or more of the first request, the first response, the second request, the second response, the third request, or the third response;
determine that the fourth request is associated with a modification to a portion of the stored data;
in response to the fourth request being associated with the modification to the portion of the stored data, delete the portion of the stored data;
after deleting the portion of the stored data, determine a lack of correspondence between the fourth request and the stored data;
in response to the lack of correspondence, send the fourth request to the first computing device; and
receive a fourth response from the first computing device.

14. A system comprising:
one or more first hardware processors associated to execute first computer-executable instructions to:
send a first request to a first computing device, wherein the first request indicates one or more of a second computing device or an application associated with the second computing device;

receive a second response from the first computing device, wherein the second response is associated with a second request;

store at least a portion of the second response as stored data;

receive a first response from the first computing device, wherein the first response is associated with the first request; and determine one or more of the second request or a third request based on one or more of the first request or the first response; and determine correspondence between the stored data and the one or more of the second request or the third request.

15. The system of claim 14, further comprising first computer-executable instructions to:

based on the correspondence between the stored data and the one or more of the second request or the third request, use the stored data to determine one or more of the second response or a third response associated with the third request.

16. The system of claim 14, further comprising first computer-executable instructions to:

based on the correspondence between the stored data and the one or more of the second request or the third request, determine insufficient stored data for determination of one or more of the second response or a third response associated with the third request;

in response to the insufficient stored data, send the one or more of the second request or the third request to the first computing device; and receive the one or more of the second response or the third response from the first computing device.

17. The system of claim 14, further comprising first computer-executable instructions to:

determine that the one or more of the second request or the third request is associated with a modification to a portion of the stored data;

delete the portion of the stored data;

send the one or more of the second request or the third request to the first computing device; and receive one or more of the second response or a third response associated with the third request from the first computing device.

18. The system of claim 14, further comprising first computer-executable instructions to:

determine that the one or more of the second request or the third request is associated with a modification to at least a portion of the stored data;

send the one or more of the second request or the third request to the first computing device; and receive one or more of the second response or a third response associated with the third request from the first computing device.

19. The system of claim 14, wherein the one or more first hardware processors are associated with a third computing device, the system further comprising one or more second hardware processors associated with the first computing device to execute second computer-executable instruction to:

receive the first request from the third computing device;

send one or more of the first request or data indicative of the first request to the second computing device;

receive the first response from the second computing device;

determine the second request based on one or more of the first response or the first request;

send the second request to the second computing device;

receive the second response from the second computing device;

send the second response to the third computing device; and send the first response to the third computing device.

20. The system of claim 19, further comprising second computer-executable instructions to:

determine a fourth request based on one or more of: the first request, the first response, the second request, or the second response;

send the fourth request to the second computing device;

receive a fourth response from the second computing device; and before sending the first response to the third computing device, send the second response and the fourth response to the third computing device as a single transmission.

* * * * *

UNITED STATES PATENT AND TRADEMARK OFFICE
CERTIFICATE OF CORRECTION

| | | |
|---|---|---|
| PATENT NO. | : 11,770,458 B1 | |
| APPLICATION NO. | : 18/065453 | |
| DATED | : September 26, 2023 | |
| INVENTOR(S) | : Simo Antti Kalervo Kinnunen et al. | |

It is certified that error appears in the above-identified patent and that said Letters Patent is hereby corrected as shown below:

In the Claims

Column 32, Claim 14, Line 63:
Currently reads: "one or more first hardware processors associated to"
When it should read: --one or more first hardware processors to--.

Column 34, Claim 19, Line 17:
Currently reads: "execute second computer-executable instruction"
When it should read: --execute second computer-executable instructions--.

Signed and Sealed this
Seventh Day of November, 2023

Katherine Kelly Vidal
*Director of the United States Patent and Trademark Office*